(12) United States Patent
Ishiguro et al.

(10) Patent No.: US 12,307,135 B2
(45) Date of Patent: May 20, 2025

(54) DISPLAY CONTROL DEVICE, MACHINE TOOL, AND DISPLAY CONTROL PROGRAM

(71) Applicant: DMG MORI CO., LTD., Nara (JP)

(72) Inventors: Takashi Ishiguro, Hokkaido (JP); Masakazu Takayama, Nara (JP); Toshinori Ouchi, Hokkaido (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 18/238,560

(22) Filed: Aug. 28, 2023

(65) Prior Publication Data

US 2023/0418526 A1 Dec. 28, 2023

Related U.S. Application Data

(63) Continuation of application No. PCT/JP2022/022582, filed on Jun. 3, 2022.

(30) Foreign Application Priority Data

Sep. 6, 2021 (JP) ................. 2021-144422

(51) Int. Cl.
*G06F 3/12* (2006.01)
*G06F 3/0482* (2013.01)

(52) U.S. Cl.
CPC .......... *G06F 3/1202* (2013.01); *G06F 3/0482* (2013.01)

(58) Field of Classification Search
CPC ... G06F 3/1202; G06F 3/0482; B23Q 1/0045; G05B 19/401; G05B 2219/50141; G05B 19/409; Y02P 90/02
See application file for complete search history.

(56) References Cited

U.S. PATENT DOCUMENTS

| | | | |
|---|---|---|---|
| 2017/0031345 A1 | 2/2017 | Ono et al. | |
| 2017/0131692 A1* | 5/2017 | Kawai | G05B 19/409 |
| 2017/0146978 A1 | 5/2017 | Kawai et al. | |
| 2017/0176980 A1 | 6/2017 | Nishioka et al. | |
| 2017/0269811 A1* | 9/2017 | Tsujimura | G06F 3/0482 |
| 2017/0300035 A1* | 10/2017 | Kawai | G05B 19/409 |
| 2017/0308063 A1 | 10/2017 | Kawai et al. | |
| 2019/0056713 A1* | 2/2019 | Ogawa | G05B 19/409 |
| 2019/0332069 A1* | 10/2019 | Saitou | G05B 19/40938 |

(Continued)

FOREIGN PATENT DOCUMENTS

| | | |
|---|---|---|
| DE | 102007016502 A1 | 10/2008 |
| JP | 2016-043462 A | 4/2016 |

(Continued)

*Primary Examiner* — Iriana Cruz
(74) *Attorney, Agent, or Firm* — IP Business Solutions, LLC

(57) ABSTRACT

A display control device according to an embodiment includes a display control unit that controls display of a setup screen for performing setup for machining in a machine tool, the setup screen including (i) a menu display part displaying a plurality of setup items in a selectable manner and (ii) a detail display part displaying an operation for each of the setup items. In control of display of the setup screen, while the setup screen is displayed, display of the setup items on the menu display part is maintained and display of the operation screens is switched on the detail display part in response to an operation input by an operator.

7 Claims, 21 Drawing Sheets

(56) References Cited

U.S. PATENT DOCUMENTS

| | | |
|---|---|---|
| 2022/0155751 A1 | 5/2022 | Matsui et al. |
| 2022/0253036 A1* | 8/2022 | Ichimaru .............. G05B 19/409 |
| 2024/0004366 A1* | 1/2024 | Watanabe ............ G05B 19/401 |
| 2024/0131649 A1* | 4/2024 | Sato ................... B23Q 17/2447 |

FOREIGN PATENT DOCUMENTS

| | | |
|---|---|---|
| WO | 2015097828 A1 | 7/2015 |
| WO | 2016051543 A1 | 4/2016 |
| WO | 2021024438 A1 | 2/2021 |

* cited by examiner

| POT No. | SERIAL No. GROUP No. | TOOL NAME | TOOL TYPE | TOOL LENGTH | TOOL DIAMETER |
|---|---|---|---|---|---|
| 1 | 0011 0001 | TOOL01 | | 1.000 | 0.200 |
| 2 | 0012 0001 | TOOL02 | | 0.000 | 0.010 |
| 3 | 0013 0001 | TOOL03 | | 0.000 | 0.000 |
| 4 | 0001 0002 | GP-2-FACE-01 | | 1.000 | 0.200 |
| 5 | 0001 0003 | GP-3-RUF-01 | | 1.000 | 0.200 |
| 6 | 0002 0002 | GP-2-FACE-02 | | 1.000 | 0.200 |
| 7 | 0003 0002 | TOOL04 | | 1.000 | 0.200 |

SETUP – SPINDLE OPERATION

1. SPINDLE OPERATION
2. TOOL MEASUREMENT
3. WORKPIECE MEASUREMENT
4. AXIS MOVEMENT

T:
SPINDLE ROTATING SPEED: S1
M CODE: NORMAL DIRECTION

FIG.8A

| POT No. | SERIAL No. GROUP No. | TOOL NAME | TOOL TYPE | TOOL LENGTH | TOOL DIAMETER |
|---|---|---|---|---|---|
| 1 | 0011 0001 | TOOL01 | | 1.000 | 0.200 |
| 2 | 0012 0001 | TOOL02 | | 0.000 | 0.010 |
| 3 | 0013 0001 | TOOL03 | | 0.000 | 0.000 |
| 4 | 0001 0002 | GP-2-FACE-01 | | 1.000 | 0.200 |
| 5 | 0001 0003 | GP-3-RUF-01 | | 1.000 | 0.200 |
| 6 | 0002 0002 | GP-2-FACE-02 | | 1.000 | 0.200 |
| 7 | 0003 0002 | TOOL04 | | 1.000 | 0.200 |

FIG.8B

| POT No. | SERIAL No. GROUP No. | TOOL NAME | TOOL TYPE | MEASUREMENT DATE |
|---|---|---|---|---|
| 1 | 0011 0001 | TOOL01 | | 2021/04/08 |
| 2 | 0012 0001 | TOOL02 | | --/--/-- |
| 3 | 0013 0001 | TOOL03 | | --/--/-- |
| 4 | 0001 0002 | GP-2-FACE-01 | | 2021/03/12 |
| 5 | 0001 0003 | GP-3-RUF-01 | | --/--/-- |
| 6 | 0002 0002 | GP-2-FACE-02 | | --/--/-- |
| 7 | 0003 0002 | TOOL04 | | --/--/-- |

FIG.9A

| POT No. | SERIAL No. GROUP No. | TOOL NAME | TOOL TYPE | TOOL LENGTH GEOMETRY | TOOL DIAMETER GEOMETRY |
|---|---|---|---|---|---|
| 1 | 0011 0001 | TOOL01 | | 1.000 | 0.200 |
| 2 | 0012 0001 | TOOL02 | | 0.000 | 0.010 |
| 3 | 0013 0001 | TOOL03 | | 0.000 | 0.000 |
| 4 | 0001 0002 | GP-2-FACE-01 | | 1.000 | 0.200 |
| 5 | 0001 0003 | GP-3-RUF-01 | | 1.000 | 0.200 |
| 6 | 0002 0002 | GP-2-FACE-02 | | 1.000 | 0.200 |
| 7 | 0003 0002 | TOOL04 | | 1.000 | 0.200 |

172
176 — UNSET TOOL | TO-BE-USED TOOL | APPLY
177  178  170  179

FIG.9B
UNSET TOOL | TO-BE-USED TOOL | APPLY

FIG.9C
UNSET TOOL | TO-BE-USED TOOL | APPLY

FIG.9D
UNSET TOOL | TO-BE-USED TOOL | APPLY

FIG.9E
UNSET TOOL | TO-BE-USED TOOL | APPLY

DISPLAY CONTROL DEVICE, MACHINE TOOL, AND DISPLAY CONTROL PROGRAM

CROSS-REFERENCE TO RELATED APPLICATIONS

This application is a continuation application of International Application No. PCT/JP2022/022582 filed on Jun. 3, 2022, which claims priority to and the benefit of Japanese Patent Application No. 2021-144422 filed on Sep. 6, 2021. The contents of these applications are incorporated herein by reference in their entirety.

BACKGROUND

1. Field

The present invention relates to a display control technology relating to setup of a machine tool.

2. Description of Related Art

In machining of a workpiece by a machine tool, incorrect relative positions of a tool and the workpiece, incorrect attachment of a tool to a tool spindle, or the like lead to lower product accuracy. Thus, a setup process of measuring the positions, the dimensions, and the like of a tool and a workpiece, and correcting these values recognized by the machine tool where necessary is performed before start of machining. If progression of wear is detected through measurement of a tool, the tool is replaced. Recently, an operation screen for such setup is displayed on a monitor of a console, and a process of measurement, correction, and the like based on operations input by an operator are performed (refer to Patent Literature 1).

Patent Literature 1: JP 2016-043462 A

Normally, various screens are displayed on a monitor of a console in addition to the operation screen for setup, such as an MDI screen onto which an operator manually inputs a program command, a screen indicating coordinates of a spindle (the position of a tool reference point), a screen indicating a tool offset for correction of a tool length, and a screen displaying a workpiece offset for setting a workpiece zero point. Furthermore, the operation screen for setup is layered and constituted by a plurality of screens.

Thus, the operator needs to continue recognizing the screen for setup (hereinafter also referred to as a "setup screen") even when the plurality of screens are switched during setup work. Furthermore, the setup work includes a plurality of items, and such screen operations as switching the items as necessary and returning to a previous item as necessary need to be repeated. If a wrong operation button is selected, the screen is switched to an unintended screen, and troublesome operations may be required to reach a necessary layer of the setup screen. There has therefore been room for improvement in the user-friendliness of screens.

SUMMARY

In an embodiment of the present invention, display of a setup screen for performing setup machining in a machine tool is controlled. The setup screen includes (i) a menu display part displaying, in a selectable manner, a plurality of setup items and (ii) a detail display part displaying an operation screen for each of the setup items.

In control of display of the setup screen, while the setup screen is displayed, display of the menu display part is maintained and display of the operation screens on the detail display part is switched in response to an operation input by an operator.

According to the present invention, the user-friendliness of screens used for setup work is improved.

BRIEF DESCRIPTION OF DRAWINGS

FIG. 5 is a diagram illustrating an example of a display screen of a monitor;
FIG. 6 is a diagram illustrating an example of a display screen of the monitor;
FIG. 7 is an enlarged diagram illustrating a setup screen;
FIGS. 8A and 8B are diagrams illustrating details of a tool selection screen;
FIGS. 9A to 9E are diagrams illustrating details of the tool selection screen.

DETAILED DESCRIPTION

An embodiment of the present invention will now be described in detail with reference to the drawings.

Figure 1:
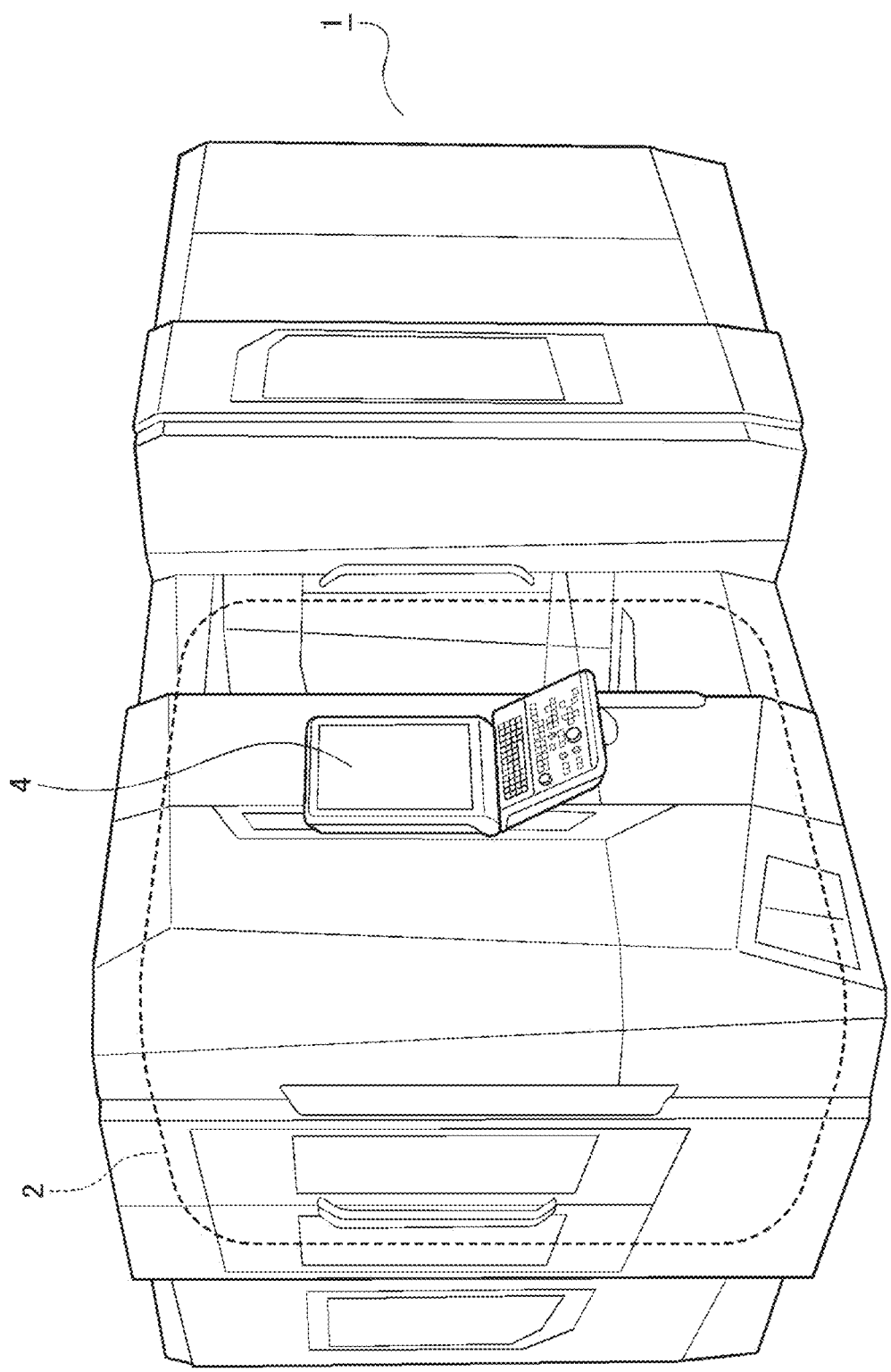
FIG. 1 is a perspective view of an external appearance of a machine tool according to an embodiment.

FIG. 1 is a perspective view of an external appearance of a machine tool according to an embodiment.

A machine tool 1 is a machining center for machining workpieces into desired shapes by appropriately changing tools. The machine tool 1 includes, inside an equipment housing, machining equipment 2 for machining workpieces. A console 4 for operating the machining equipment 2 is provided on a front face of the equipment housing.

Figure 2:
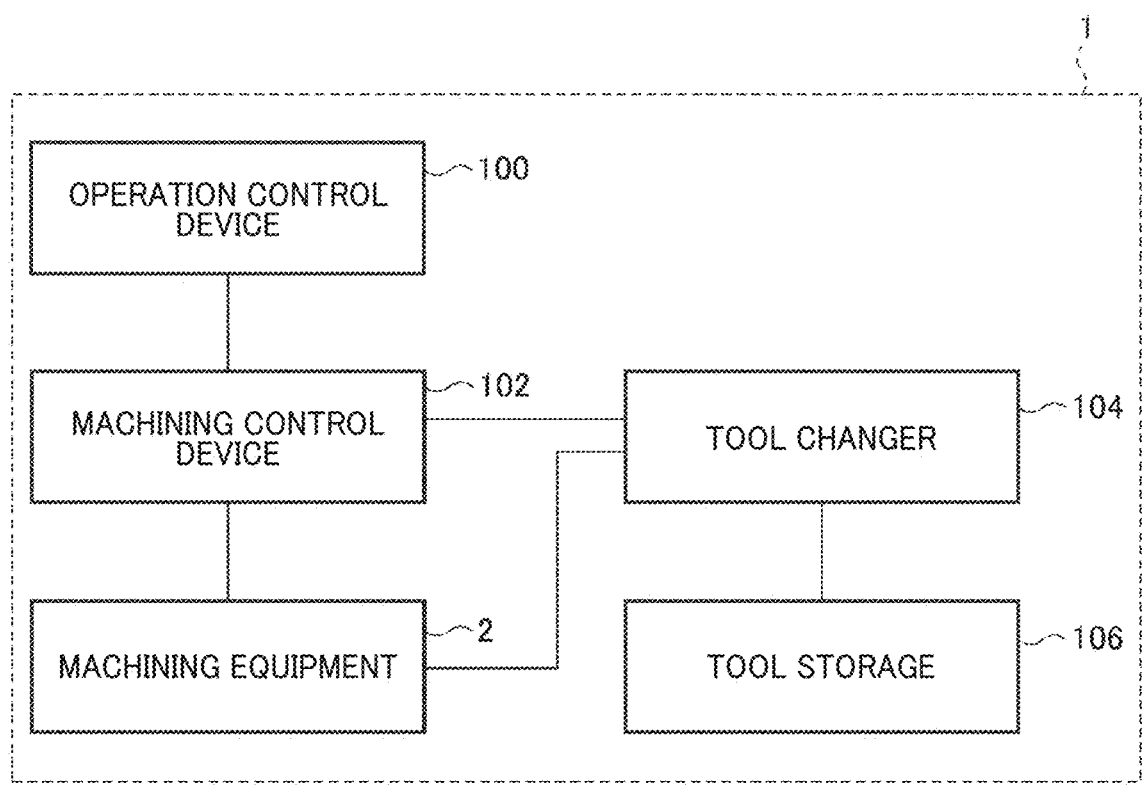
FIG. 2 is a diagram of a hardware configuration of the machine tool.

FIG. 2 is a diagram of a hardware configuration of the machine tool 1.

The machine tool 1 includes an operation control device 100, a machining control device 102, the machining equipment 2, a tool changer 104 and a tool storage 106. The machining control device 102 functions as a numerical control unit, and outputs control signals to the machining equipment 2 in accordance with machining programs (NC programs). The machining equipment 2 moves a tool spindle (not illustrated; hereinafter simply referred to as a "spindle") in accordance with instructions from the machining control device 102 to machine a workpiece.

The operation control device 100 includes the console 4, and outputs control commands to the machining control device 102 on the basis of operations input by an operator. The operation control device 100 also functions as a "display control device" that controls display screens of the console 4 in response to operations input by the operator. The tool storage 106 stores tools. The tool changer 104 corresponds to a so-called automatic tool changer (ATC), which takes a tool out from the tool storage 106 and replaces the taken-out tool with the tool on the spindle in accordance with a replacement instruction from the machining control device 102.

Figure 3:
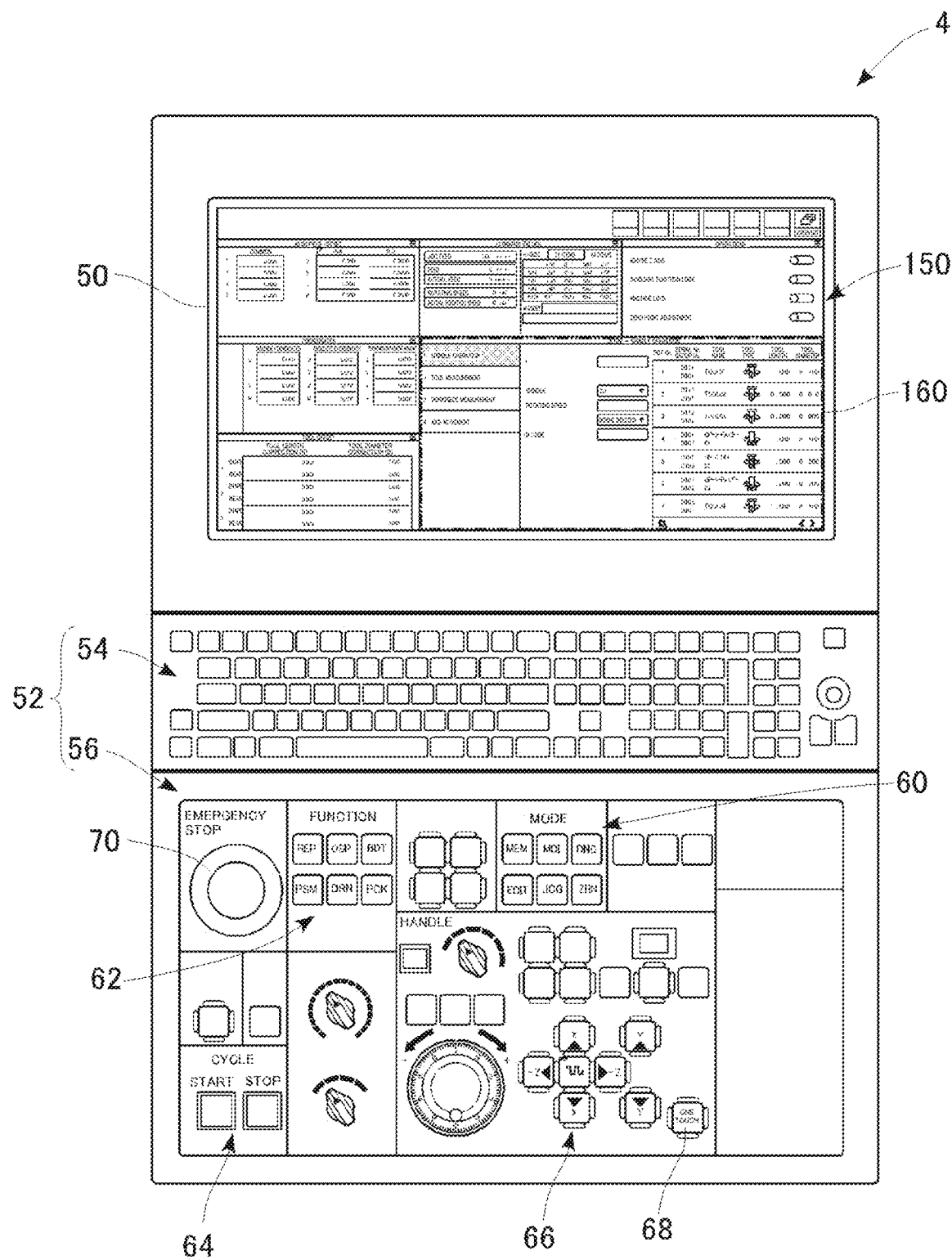
FIG. 3 is a front view schematically illustrating a console.

FIG. 3 is a front view schematically illustrating the console 4.

The console 4 includes a monitor 50 that displays a variety of information to the operator and receives touch operations, and physical operation panels 52 that receive operations input by the operator. The monitor 50 functions as a "display unit" that displays various operation screens for receiving touch operations, such as touch operations and key inputs, input by the operator. Various screens which the operator refers to and performs operations on are displayed on a display screen 150 of the monitor 50. A setup screen 160, which will be described later, covers part of the whole display screen. The operation panels 52 include an NC operation panel 54 and a machine operation panel 56.

The NC operation panel 54 includes various keys to be pressed by an operator to create or edit a control program. The machine operation panel 56 includes various buttons, dials, and the like to be pressed or turned by an operator to switch the operation mode of the machine tool 1 or perform manual operations. An operation device constituted by a touch panel of the monitor 50 may also be referred to as a "software device", and an operation device constituted by the NC operation panel 54 or the machine operation panel 56 may also be referred to as a "hardware device".

The machine operation panel 56 includes mode selection buttons 60, NC function buttons 62, automatic operation buttons 64, manual axis feed buttons 66, a zero return button 68, an emergency stop button 70, and the like. The mode selection buttons 60 include a plurality of buttons for mode switching. Specifically, an MEM button for switching to a memory mode, an MDI button for switching to an MDI mode, a DNC button for switching to a DNC mode, an EDIT button for switching to an edit mode, a JOG button for switching to a jog mode, and a ZRN button for switching to a zero return mode are included.

The "memory mode" is an automatic operation mode in which the machining equipment 2 is operated in accordance with a control program provided in advance. The "MDI mode" is a mode in which simple program commands are manually input to operate the machining equipment 2. The "DNC mode" is a mode in which a control program stored in an external terminal is received to control the machining equipment 2. The "edit mode" is a mode in which a control program is created or edited. The "jog mode" is a manual operation mode in which a controlled object, such as the spindle, is axially moved mainly by operation of the manual axis feed buttons 66. The "zero return mode" is a mode in which a controlled object, such as the spindle, is returned to a machine zero point. The operator can press any one button to switch the mode to the selected mode.

The NC function buttons 62 include a plurality of buttons for switching the function of the numerical control unit. Specifically, a PCK button, a DRN button, and so on are included. The PCK button is pressed to make rotation of the spindle and discharge of coolant inactive before so-called program check. The DRN button is pressed to move an axis of a controlled object at a preset rate. This is used to shorten the time for no-load running operation for program check. In this process, the rate specified in the program is ignored.

The automatic operation buttons 64 include a START button and a STOP button. The START button is pressed to start automatic operation (also referred to as "cycle start"). Depression of the START button corresponds to "control start input". The STOP button is pressed to temporarily stop moving an axis during automatic operation.

The manual axis feed buttons 66 include selection keys and arrow keys that are pressed to manually perform jog feed operation, jog rapid traverse operation, and zero return operation. The manual axis feed buttons 66 receive input of operations for moving the spindle in the jog mode. In the jog mode, either of the jog feed operation and the jog rapid traverse operation can be selected.

The zero return button 68 is pressed to perform zero return operation with a single touch. When this button is pressed, all the axes sequentially return to machine zero points thereof. The emergency stop button 70 is pressed to urgently stop the machine. Regardless of whether the machining equipment 2 is manually operated or automatically operated, all the operations in the machining equipment 2 are immediately stopped at the current positions.

Figure 4:
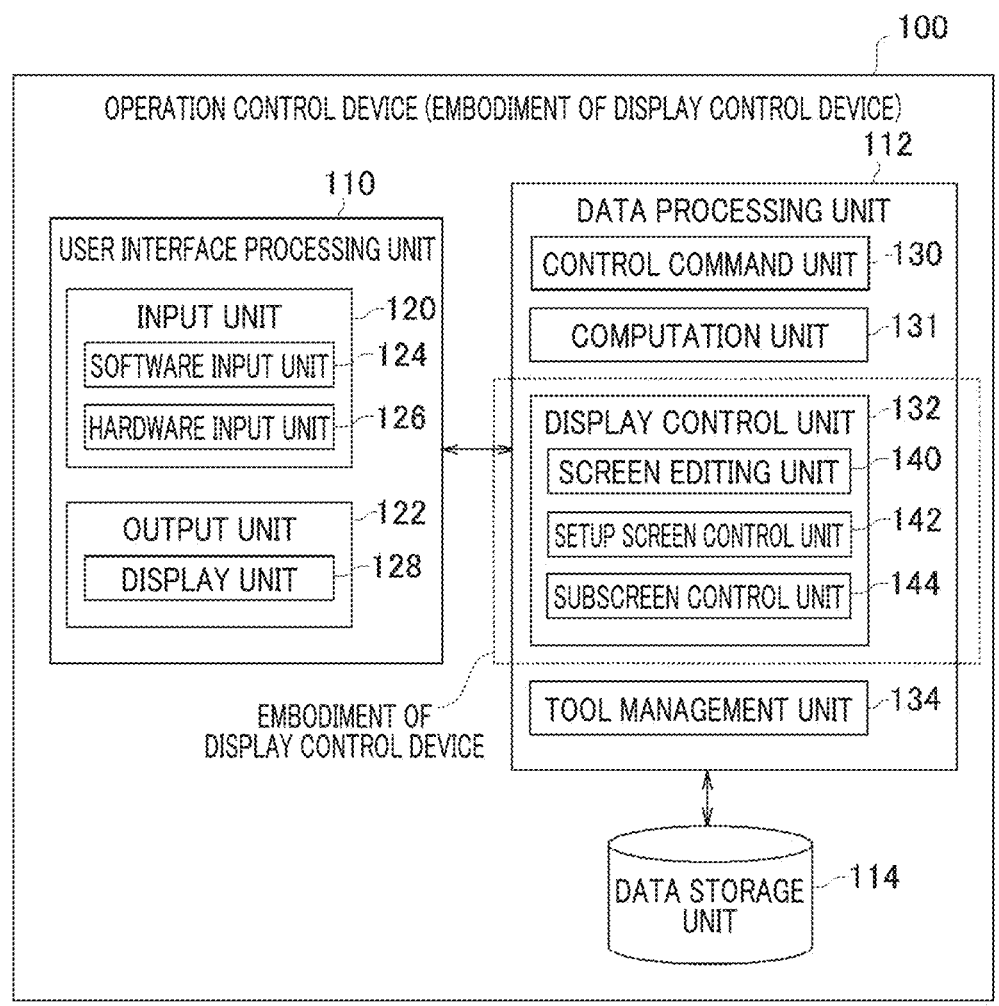
FIG. 4 is a functional block diagram of an operation control device.

FIG. 4 is a functional block diagram of the operation control device 100.

The components of the operation control device 100 are implemented by hardware including computing units such as central processing units (CPUs) and various computer processors, storage devices such as memories and storages, and wired or wireless communication lines that connect these units and devices, and software that is stored in the storage devices and supplies processing instructions to the computing units. Computer programs may be constituted by device drivers, operating systems, various application programs on upper layers thereof, and a library that provides common functions to these programs. Blocks to be described below do not refer to configurations in units of hardware but to blocks in units of functions.

The operation control device 100 includes a user interface processing unit 110, a data processing unit 112, and a data storage unit 114. The user interface processing unit 110 performs processes related to user interfaces such as receiving operations input by an operator and displaying images. The data processing unit 112 performs various processes on the basis of data obtained by the user interface processing unit 110 and data stored in the data storage unit 114. The data processing unit 112 also functions as an interface of the user interface processing unit 110 and the data storage unit 114. The data storage unit 114 stores various programs and set data therein.

The user interface processing unit 110 includes an input unit 120 and an output unit 122. The input unit 110 includes a software input unit 124 that receives inputs via the touch panel of the monitor 50, and a hardware input unit 126 that receives inputs via various buttons and dials of the operation panels 52. The output unit 122 includes a display unit 128 that displays images and the like on the screens of the monitor 50. The output unit 122 provides a variety of information to the operator via the display.

The data processing unit 112 includes a control command unit 130, a computation unit 131, a display control unit 132, and a tool management unit 134. The control command unit 130 outputs control commands to the machining control device 102 on the basis of operations input by the operator via the input unit 120. The machining control device 102 controls the machining equipment 2 in accordance with the control commands and the machining programs. The computation unit 131 performs predetermined computation processes relating to setup work and the like of the operator.

The display control unit 132 includes a screen editing unit 140, a setup screen control unit 142, and a subscreen control unit 144. The screen editing unit 140 edits arrangement of screens on the monitor 50. The setup screen control unit 142 controls display of a setup screen for guiding setup work conducted by the operator. The subscreen control unit 144 controls display of a plurality of subscreens arranged around the setup screen. Details of these screens will be described later.

The tool management unit 134 manages information (tool information) of tools stored in the tool storage 106 in association with tool IDs. The tool information includes identification information and detailed information to be displayed on the setup screen (details of which will be described later).

The data storage unit 114 stores various programs including setup screen display control programs, and also stores screen data of respective modes to be displayed on the monitor 50, various image data such as graphical user interface (GUI) data and the like to be displayed in the screens, data such as the tool information, and various data obtained through measurement and computation processes. The data storage unit 114 also functions as a work area for computation processes.

Next, control of display of the setup screen according to the embodiment will be explained in detail.

Figure 5:
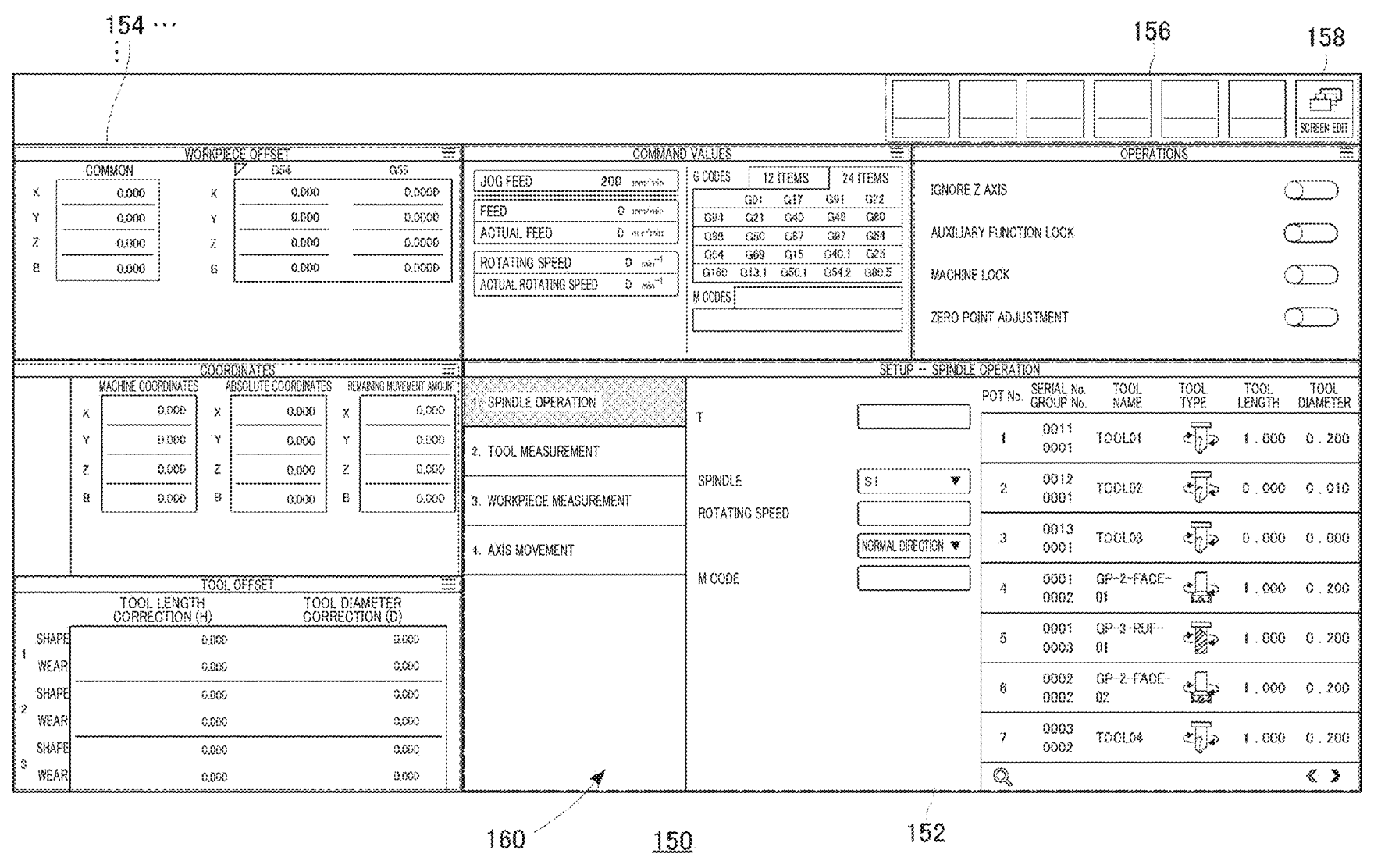
Figure 6:
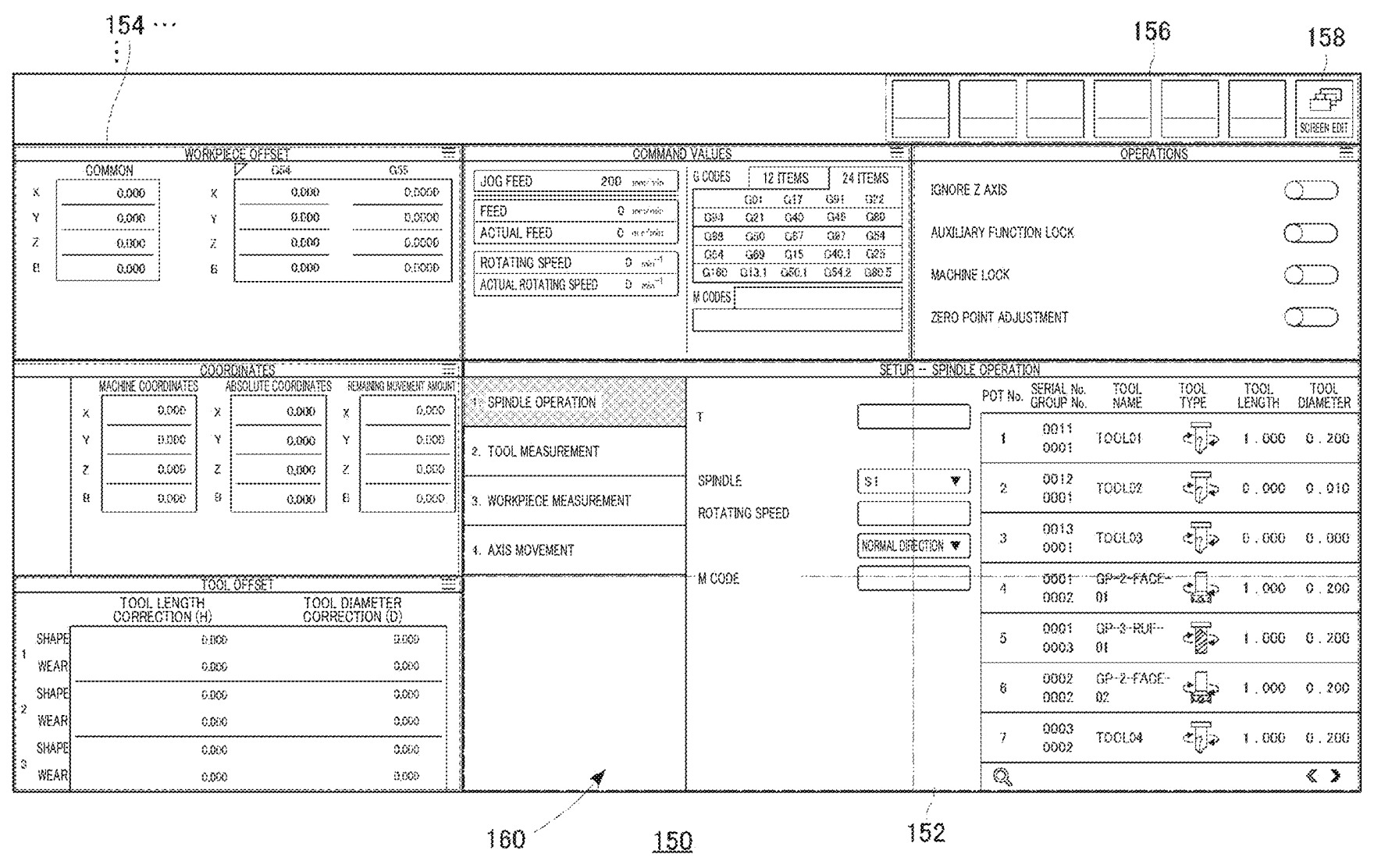

FIGS. 5 and 6 are diagrams illustrating examples of the display screen of the monitor 50.

As illustrated in FIG. 5, a main screen display area 152 and subscreen display areas 154 are set on the display screen 150 of the monitor 50. The main screen display area 152 is an area in which a main screen that the operator mainly operates is displayed and which covers a large area on the display screen 150. In the illustrated example, the setup screen 160 is displayed as the main screen display area 152. The setup screen 160 is a screen that the operator operates for setup work.

The subscreen display areas 154 are areas in which subscreens to be referred to by the operator where necessary when operating the main screen are displayed and which have a smaller size and are arranged around the main screen display area 152. Specifically, each subscreen display area 154 is set to ¼ the size of the main screen display area 152, and five subscreens can be displayed. In the illustrated example, a tool offset screen, a coordinate screen, a workpiece offset screen, a command value display screen, and an operation screen are displayed as the subscreens.

In other words, as illustrated in FIG. 6, the display screen 150 includes a rectangular display area in which the main screen display area 152 and the subscreen display areas 154 are set. The display area is divided into 3×3 sections (see dashed lines and two-dot chain lines in FIG. 6), and the main screen display area 152 covers four out of the nine sections. Specifically, the setup screen 160 covers lower-right four sections in the display area. As also illustrated in FIG. 3, while the console 4 is relatively large, the setup screen 160 is set in a lower area of the display screen 150, and the setup screen 160 and the operation panels 52 are therefore arranged at positions physically close to each other. As a result, the operator-friendliness of the setup work can be increased.

The description refers back to FIG. 5, in which the tool offset screen displays a detected tool offset. A tool reference point is set on the axis of the spindle near the end face of the spindle, and the length (tool length) of each tool is a length from the tool reference point to its nose, which is registered in advance. When an axis movement command is issued from the numerical control unit, the tool reference point is positioned at the command coordinate values. Thus, when the actual tool length has changed owing to an error in attachment of the tool onto the spindle, wear or the like, the amount of change needs to be corrected and a tool movement command (coordinates to which the tool is to be moved) needs to be set. The "tool offset" corresponds to the correction value that is set by the setup work.

The coordinate screen displays machine coordinates, absolute coordinates, and the like of the tool reference point. The workpiece offset screen displays a detected workpiece offset. The "workpiece offset" corresponds to a workpiece zero point (an origin that is a reference for machining). A workpiece coordinate system including the workpiece zero point can be set using G codes (G54 to G59). The command value display screen displays current values of respective control parameters. The operation screen includes an operation screen for switching the operating state of a predetermined mechanism of the machining equipment 2. Description of the details thereof is omitted.

On an upper part of the display screen 150, a function switching area 156 in which a plurality of buttons (icons) for greatly switching the screen configuration are arranged is provided. A screen editing button 158 is provided as one of the buttons. When the screen editing button 158 is selected, a plurality of candidates of screens that can be arranged in the main screen display area 152 and the subscreen display areas 154 are displayed. The operator can arrange a screen candidate in either area by dragging the screen candidate or the like. Thus, individual screens displayed in the main screen display area 152 and the subscreen display areas 154 can be changed.

FIG. 7 is an enlarged diagram illustrating the setup screen 160.

The setup screen 160 is a dedicated screen that is always displayed on the display screen 150 during a setup process, and includes a menu display part 162 and a detail display part 164. The menu display part 162 is arranged on the left and the detail display part 164 is arranged on the right of the screen. On the menu display part 162, a plurality of setting item selection buttons 166 are vertically arranged in a selectable manner. In the present embodiment, four items are set as setting items, which are spindle operation, tool measurement, workpiece measurement, and axis movement. Needless to say, other items may be set. On the menu display part 162, measurement items (measurement objects) such as tool measurement and workpiece measurement are included.

Note that the "spindle operation" corresponds to a setup of simply performing operations relating to the spindle. Operation items of the spindle operation include tool change, spindle rotation, M code execution, and the like. The "tool measurement" corresponds to a setup of measuring a tool before use thereof. Operation items of the tool measurement include measurement of tool length, tool diameter, and the like. The "workpiece measurement" corresponds to a setup of measuring a workpiece before machining thereof. The operation items of the workpiece measurement include measurement of the shape, the position, and the like of a workpiece. The "axis movement" relates to movement of control axes (X axis, Y axis, etc.) of the spindle, and the like, and corresponds to simply performing movement of the axes.

On the detail display part 164, operation screens depending on the setup items are displayed. While the setup screen 160 is displayed, the arrangement of the setup items in the menu display part 162 is fixed, so that any of the setup items is always selectable. Meanwhile, on the detail display part 164, each time the selected setup item is changed, the operation screen is switched to that associated with the selected setup item after the change. The operation screens are layered, and the layer is switched in response to an operation performed by the operator.

In the example of FIG. 7, the spindle operation is selected from the setup items on the menu display part 162, and a setup screen for spindle operation is displayed as the setup screen 160. On the setup screen for spindle operation, a setting screen 168 and a tool reference screen 170 are displayed laterally as the operation screens on the detail display part 164. The illustrated screens are top screens of the setup screen of the spindle operation.

The setting screen 168 receives input of information relating to a tool, and receives input of a value relating to the spindle rotating speed. Specifically, a tool setting part for tool change, a spindle setting part for spindle rotation, a rotating speed setting part and a rotating direction setting part, and an M code setting part for execution of M codes are provided in this order from the top of the setting screen 168.

The tool reference screen 170 displays a list of tools that are available for tool change, that is, tools that can be called from a magazine. The tool reference screen 170 displays selection buttons 172 of the tools vertically in a selectable manner.

Although not illustrated, the tool reference screen 170 is vertically scrollable. While the number of tools in the list that can be displayed on one screen is limited (which is seven in the illustrated example), the list on the screen can be scrolled to check the tool information of all the registered tools. The operator can select a tool to be attached onto the spindle by referring to the tool information.

FIGS. 8A, 8B, and 9A to 9E are diagrams illustrating details of the tool reference screen 170.

The tool reference screen 170 includes a tool list display part 171 and a tool detail display part 173 that are arranged laterally. The tool list display part 171 displays a list of identification information of tools that can be selected for measurement. The selection buttons 172 are provided for respective tools over the tool list display part 171 and the tool detail display part 173. The tool list display part 171 displays, as the tool information, the pot number of the magazine in which each tool is accommodated, the identification information (the serial number and the group number), the tool name, and the tool type of each tool. The selection buttons 172 receive selection of a tool to be measured.

The tool detail display part 173 displays the detailed information of each tool in association with the identification information thereof. As the detailed information of each tool, a plurality of kinds of information such as a tool length, a tool diameter, and a measurement date thereof can be displayed. Display of the measurement date allows the operator to be encouraged to measure a tool that needs the setup work, such as an unmeasured tool or a tool with an early measurement date. Page switching buttons 174 are provided under the tool detail display part 173, which allow switching of display of the detailed information.

The page switching buttons 174 include a next page button 174a and a previous page button 174b. The display control unit 132 switches display of the detailed information on the tool detail display part 173 in response to an input of operation on the page switching buttons 174 performed by the operator. In the illustrated example, a state in which the tool lengths and the tool diameters are displayed (FIG. 8A) and a state in which the measurement dates are displayed (FIG. 8B) on the tool detail display part 173 are shown. However, detailed information other than these items may be set and page switching between the set items may be enabled.

On a lower part of the tool reference screen 170, a filter button 175 for narrowing down the tools to be selected is provided. When the filter button 175 is selected, a filter screen 176 (tool bar) is displayed on a lower part of the tool reference screen 170 as illustrated in FIG. 9A. On the filter screen 176, an unset tool button 177, a to-be-used tool button 178, and an apply button 179 are provided.

The unset tool button 177 is a button to be selected to extract tools for which the setup work has not been completed. Hereinafter, a tool for which the setup work has not been completed will also be referred to as an "unset tool" and a tool for which the setup work has been completed will also be referred to as a "set tool". Whether or not each tool is an unset tool is managed by the tool management unit 134. The to-be-used tool button 178 is a button to be selected to extract tools to be used in a specified machining program. Hereinafter, a tool to be used in a specified machining program will also be referred to as a "to-be-used tool", and a tool not to be used therein will also be referred to as a "not-to-be-used tool". Whether or not each tool is a to-be-used tool is managed by the tool management unit 134.

Each of the unset tool button 177 and the to-be-used tool button 178 is inactive while being unselected, becomes active when selected, and becomes inactive when deselected. The apply button 179 is a button to be selected to apply a filter based on active/inactive states of the unset tool button 177 and the to-be-used tool button 178. The display control unit 132 narrows down the tools to be displayed on the tool reference screen 170 in response to the operation on the buttons performed by the operator.

Specifically, the tools to be displayed on the tool reference screen 170 are narrowed down as follows. When both of the unset tool button 177 and the to-be-used tool button 178 are inactive, all the tools are displayed (display of tools is not narrowed down) whether the tools are set or not or to be used or not (FIG. 9B). When the unset tool button 177 is active and the to-be-used tool button 178 is inactive, display of the tools is narrowed down to unset tools (FIG. 9C). When both of the unset tool button 177 and the to-be-used tool button 178 are active, display of the tools is narrowed down to unset and to-be-used tools (FIG. 9D). When the unset tool button 177 is inactive and the used tool button 178 is active, display of the tools is narrowed down to to-be-used tools (FIG. 9E). The filter function as described above increases the work efficiency of the operator.

The description refers back to FIG. 7, in which the operation items of the spindle operation can be performed in the following procedures by using the setup screen for spindle operation. Note that the operations are assumed to be performed after the operation mode is switched to the jog mode (manual operation mode) by operation of the mode selection buttons 60 described above.

Tool Change

The tool setting part (T) receives, as information relating to a tool, the identification information of a tool that is specified to be set up for tool change by the operator. The operator can set a tool for tool change by selecting a tool from the tool list displayed on the tool reference screen 170 and inputting information specifying the tool into the tool setting part (T). The input of the tool information can be performed by key input (manual input) of a tool number (serial number+group number) or a tool name into the tool setting part. Alternatively, when a tool for replacement is selected from the tool list (a plurality of selection buttons 172) and a load button thereof, which is not illustrated, is selected, the tool number thereof is automatically input to the tool setting part.

When the START button (automatic operation buttons 64) is pressed in the state in which the tool information is input as described above, the control command unit 130 outputs a tool change command to the machining control device 102. As a result, the tool changer 104 performs tool change.

Spindle Rotation

A spindle selecting part receives selection of a spindle that is specified to be set up by the operator. The operator selects a spindle to be rotated from a plurality of spindles displayed in a pull-down menu on the spindle selecting part. In the illustrated example, a spindle S1 is selected. Alternatively, spindles S2, S3 and the like (not illustrated) included in the pull-down menu can also be selected. In addition, the rotating speed setting part receives input of a value relating to the rotating speed of the spindle. The operator inputs a numerical value to the rotating speed setting part to set the spindle rotation speed. Furthermore, the operator selects either of the normal direction and the reverse direction from the rotating directions displayed in a pull-down menu on the rotating direction setting part. In the illustrated example, the normal direction is selected.

When the START button is pressed in the state in which the information for spindle rotation is input as described above, the control command unit 130 outputs a spindle rotation command to the machining control device 102. As a result, the corresponding spindle is rotated.

M Code Execution

The operator inputs an M code to the M code setting part by key input. Note that an M code is a command relating to an auxiliary function such as rotating/stopping a spindle, turning coolant on/off, or the like, description of details of which is omitted herein. When the START button is pressed in the state in which an M code is input to the M code setting part, the control command unit 130 outputs a control command to the machining control device 102. As a result, the corresponding M code is executed.

Figure 10:
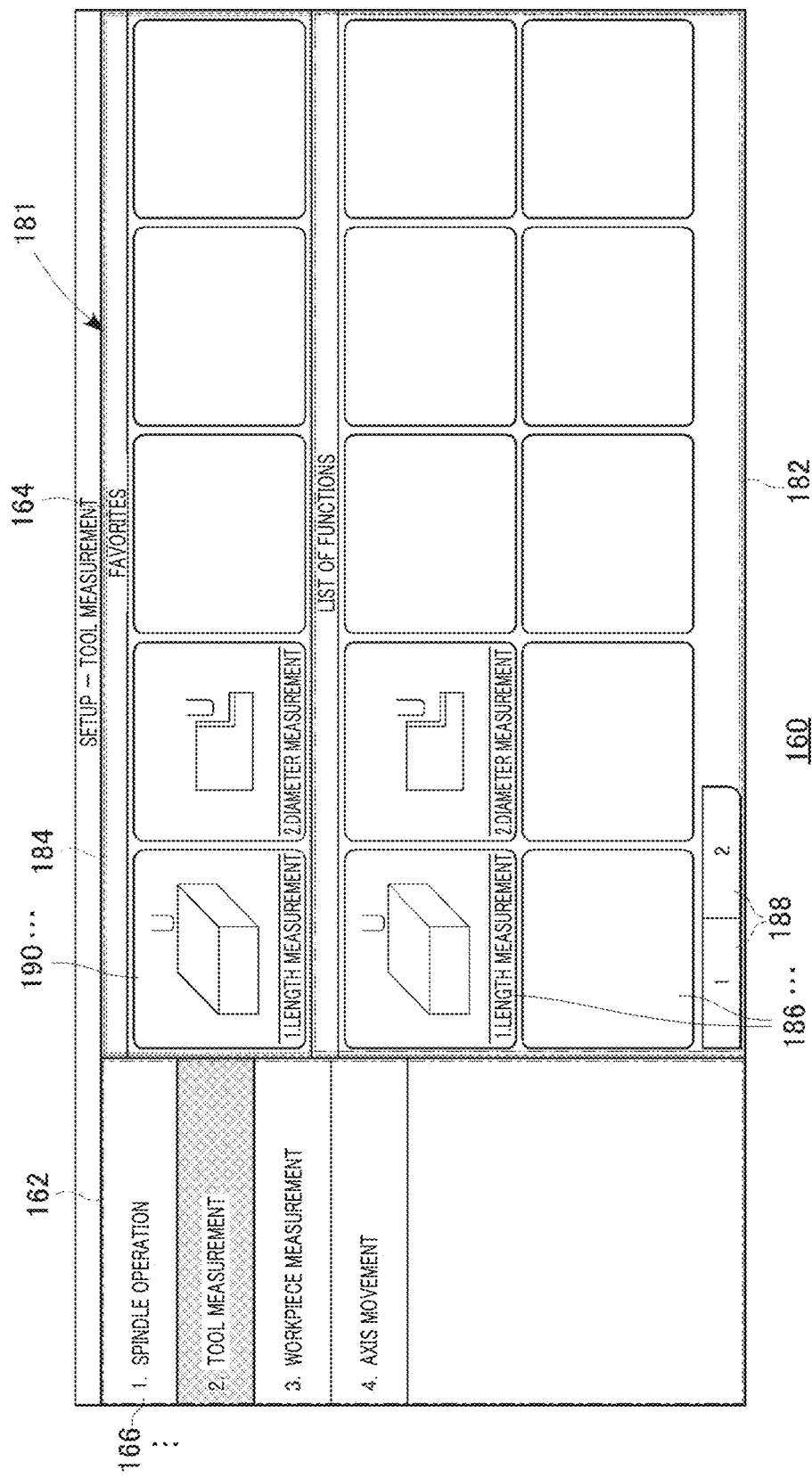
FIG. 10 is a diagram illustrating another example of the setup screen.

FIG. 10 is a diagram illustrating another example of the setup screen 160.

In the illustrated example, the tool measurement is selected from the setup items on the menu display part 162, and a setup screen for tool measurement is displayed as the setup screen 160. As an operation screen on the detail display part 164, a function selecting screen 181 for receiving selection of a measurement function (a type of tool measurement) is displayed. The function selecting screen 181 includes a measurement list display part 182 and a specified measurement display part 184 arranged vertically. The illustrated screens are top screens of the setup screen for tool measurement.

The measurement list display part 182 is a "function list display part" on which a function list screen, which is a list of selectable tool measurement functions, is displayed. On the measurement list display part 182, a plurality of registration fields 186 for registering measurement functions are provided. Page buttons 188 are provided just below the measurement list display part 182, which enables page switching of the function list screen. In the illustrated example, the screen can be switched between two pages, and a total of ten registration fields 186 in five columns and two rows per page are provided. In each registration field 186, an icon (icon image) that is an image indicating a type of tool measurement (measurement function) is displayed. Each icon is constituted by a pattern or a figure indicating a type of tool measurement, and receives input of selection (that is, selection of a measurement function) made by the operator. Each icon image is a visible image, which allows each of measurement operations to be individually visible.

The specified measurement display part 184 is a "specified function display part" for displaying a so-called a favorite screen on which specific measurement functions that are selected from measurement functions on the function list screen are arranged. On the specified measurement display part 184, a plurality of registration fields 190 for registering measurement functions that are selected as favorites (hereinafter referred to as "registration in favorites") are provided. In each registration field 190, an icon (image) associated with a measurement function registered in favorites is displayed. Each of the icons in the registration fields 190 is also constituted by a pattern or a figure indicating a type of tool measurement, and receives input of selection (that is, selection of a measurement function) made by the operator. The specified measurement display part 184 has no page switching function. In the illustrated example, a total of five registration fields 190 in five columns and one row are provided.

The display control unit 132 adds or deletes a measurement function displayed on the specified measurement display part 184 in response to an operation input by the operator. The operator can perform the registration in favorites by dragging and dropping an icon on the function list screen onto the favorite screen. In addition, the registration in favorites may be performed by touching (selecting) an edit button, which is not illustrated, to enter an edit mode and specifying an icon on the function list screen. Deletion of a measurement function can be performed by selecting the icon of the corresponding measurement function and touching a delete key or the like.

Only a limited number (five in the present embodiment) of measurement functions among the measurement functions displayed on the function list screen can be registered in favorites. A new registration made in excess of the limited number is written over one of previously registered measurement functions. In the present embodiment, when one or more unregistered fields are present on the favorite screen, a newly selected measurement function is registered in an unregistered field in a left-aligned manner. When no unregistered field is present on the favorite screen, a newly selected measurement function is written over the measurement function in the rightmost field. The registration in favorites on this screen can be made in any of the favorite fields by so-called drag and drop or touch and touch. Each icon displayed on the favorite screen also receives input of selection of tool measurement made by the operator. Thus, registration of frequently used measurement functions in favorites allows the operator to easily recognize the corresponding icons and thus increase work efficiency.

While two measurement functions, which are "length measurement" of measuring the tool length and "diameter measurement" of measuring the tool diameter, are illustrated on the function list screen of FIG. 10, more measurement functions can be registered. Needless to say, a number of measurement functions may be added over two pages. Furthermore, a page adding function allowing three or more pages, or the like, may be provided.

Tool Measurement

Figure 11A:
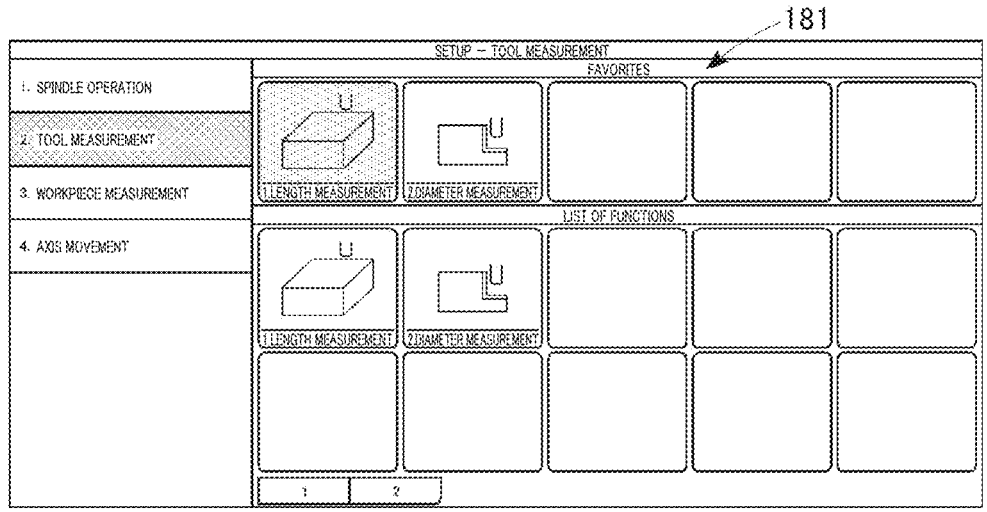
FIGS. 11A to 11C are diagrams illustrating screen transitions of a setup screen for tool measurement.
Figure 11B:
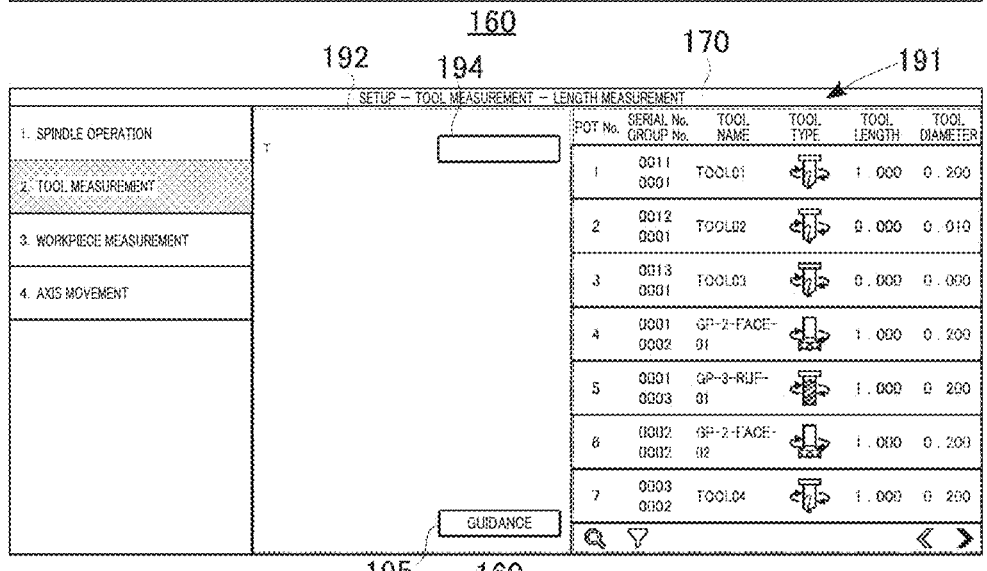
Figure 11C:
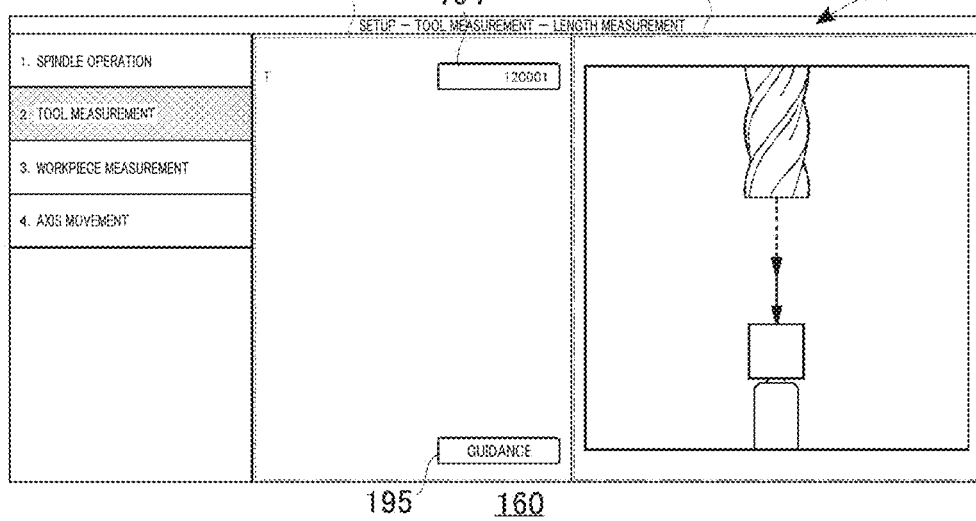

FIGS. 11A to 11C are diagrams illustrating screen transitions of the setup screen for tool measurement.

The tool measurement can be performed in accordance with the following procedures by using the setup screen for tool measurement. Assume that the operation mode has been switched to the jog mode (manual operation mode) by operation of the mode selection buttons 60 described above.

When any of the measurement functions on the function selecting screen 181 is selected by the operator (FIG. 11A), the display control unit 132 switches the function selecting screen 181 to a tool selection screen 191 (FIG. 11B). The tool selection screen 191 is a screen for selecting a tool to be measured, and is substantially the same as the screen illustrated in FIG. 7.

The tool selection screen 191 includes a setting screen 192 and the tool reference screen 170 arranged laterally. The setting screen 192 includes a tool setting part 194 that receives input of a tool to be measured, and a guidance button 195 to be selected to display guidance for the tool measurement. A tool bar may be provided on a lower part of the setting screen 192 to display the guidance button 195. In a manner similar to the case of spindle operation, the operator can input a tool by referring to the tool reference screen 170 and inputting the tool number or the tool name to the tool setting part 194 by key input (manual input). Alternatively, when a tool for replacement (measurement) is selected from the tool list and a load button thereof, which is not illustrated, is selected, the tool number thereof is automatically input to the tool setting part 194.

When the guidance button 195 is selected by the operator, the display control unit 132 switches the tool selection screen 191 to a function detail screen 193 (FIG. 11C). The function detail screen 193 is a separate screen associated with each function included in the function selecting screen 181, and includes the setting screen 192 and a guidance screen 196 arranged laterally. In the illustrated example, because the length measurement is selected as the measurement function, a video of guidance for the length measurement is displayed as the guidance screen 196.

When the START button (automatic operation buttons 64) is pressed in the state in which the tool information is input to the tool setting part 194, the control command unit 130 outputs a tool movement command to the machining control device 102. As a result, the spindle is moved, and the computation unit 131 performs a computation process for the tool measurement.

For example, for measurement of the tool length, a contact sensor is installed at a predetermined position on a table on which a workpiece is to be mounted in the present embodiment. A reference position for tool measurement is set immediately above the sensor. The height from the upper face of the table to the reference position and the height from the upper face of the table to the upper face (detection face) of the sensor are stored in advance in the data storage unit 114. Thus, when the amount of movement of the spindle on which a tool is mounted being lowered from the reference position until the tool leading end touches the sensor is known, the tool length can be calculated. Specifically, the tool length can be calculated by subtracting the height of the upper face of the sensor and the movement amount (lowering amount) of the spindle from the height of the reference position.

For measurement of the tool length, the tool reference point of the spindle is moved to the reference position in accordance with a command from the control command unit 130. Then, the spindle is lowered in a state in which the tool to be measured is attached to the spindle, and stopped when the tool touches the sensor. The computation unit 131 calculates the tool length by the computation method as described above. In addition, the tool offset is calculated at the same time. Note that the tool diameter can be measured by bringing the tool laterally (radially) in contact with the sensor, detailed description of which is omitted.

Measured numerical values are automatically stored as detailed information of the tool into the data storage unit 114. The display control unit 132 reflects the measurement result in the screen display. Alternatively, in a modification, the measured numerical values may be stored in the data storage unit 114 by operations input by the operator.

Figure 12:
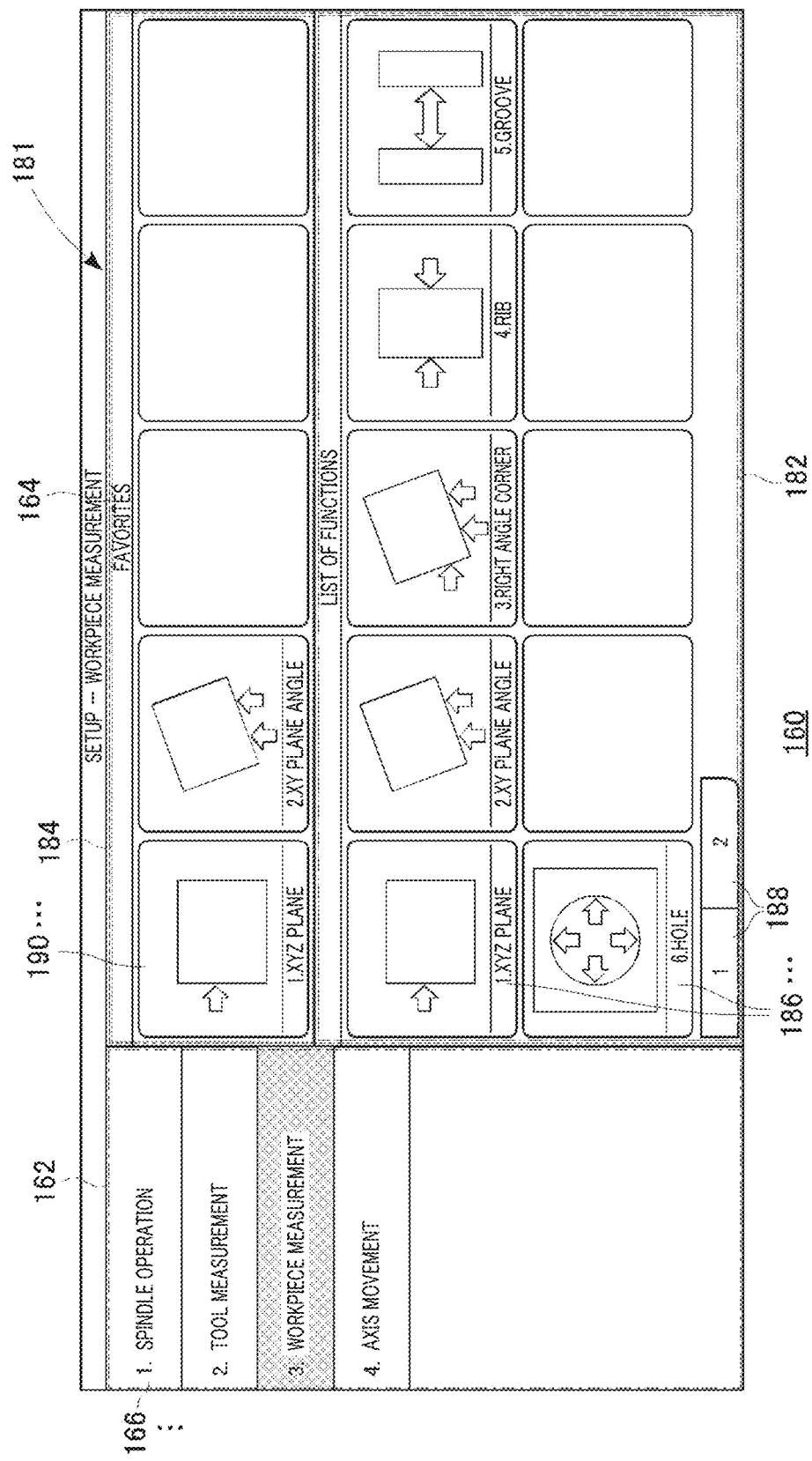
FIG. 12 is a diagram illustrating a still another example of the setup screen.

FIG. 12 is a diagram illustrating a still another example of the setup screen 160.

In the illustrated example, workpiece measurement is selected from the setup items on the menu display part 162, and a setup screen for workpiece measurement is displayed as the setup screen 160. In a manner similar to the case of tool measurement, a function selecting screen 181 for receiving selection of a measurement function (a type of workpiece measurement) is displayed on the detail display part 164. The function selecting screen 181 includes a measurement list display part 182 and a specified measurement display part 184. The illustrated screens are top screens of the setup screen for workpiece measurement.

The measurement list display part 182 displays a function list screen, which is a list of selectable workpiece measurement functions. In each of registration fields 186 on the measurement list display part 182, an icon (image) for selecting a measurement function is displayed. The specified measurement display part 184 displays a favorite screen. In each of registration fields 190 on the specified measurement display part 184, an icon (image) associated with a measurement function registered in favorites is displayed. The display control unit 132 adds or deletes a measurement function displayed on the specified measurement display part 184 in response to an operation input by the operator. Deletion of a measurement function can be performed by selecting the icon of the corresponding measurement function and touching a delete key or the like.

While six measurement functions, which are "XYZ plane" for measuring the position of an end face of a workpiece, "XY plane angle" for measuring the inclination of a workpiece, "right angle corner" for measuring the position of a corner of a workpiece, "rib" for measuring the thickness of a workpiece, "groove" for measuring the width of a groove formed on a workpiece, and "hole" for measuring the inner diameter of a hold formed in a workpiece, are illustrated on the function list screen in FIG. 12, more measurement functions can be additionally registered. Needless to say, a number of measurement functions over two pages can be added. Furthermore, a page adding function allowing three or more pages, or the like may be provided.

Workpiece Measurement

Figure 13A:
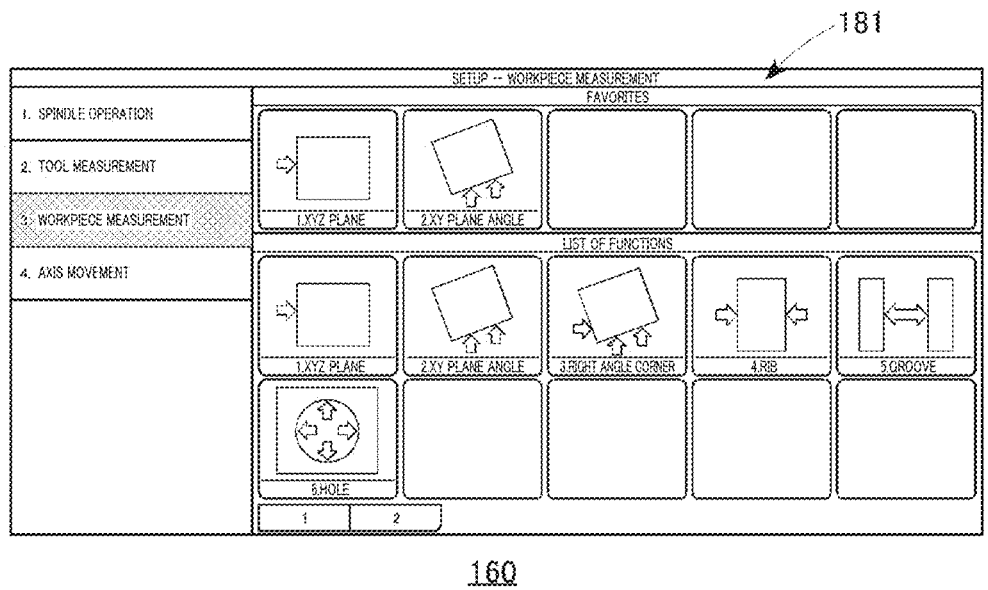
FIGS. 13A and 13B are diagrams illustrating screen transitions of a setup screen for workpiece measurement.
Figure 13B:
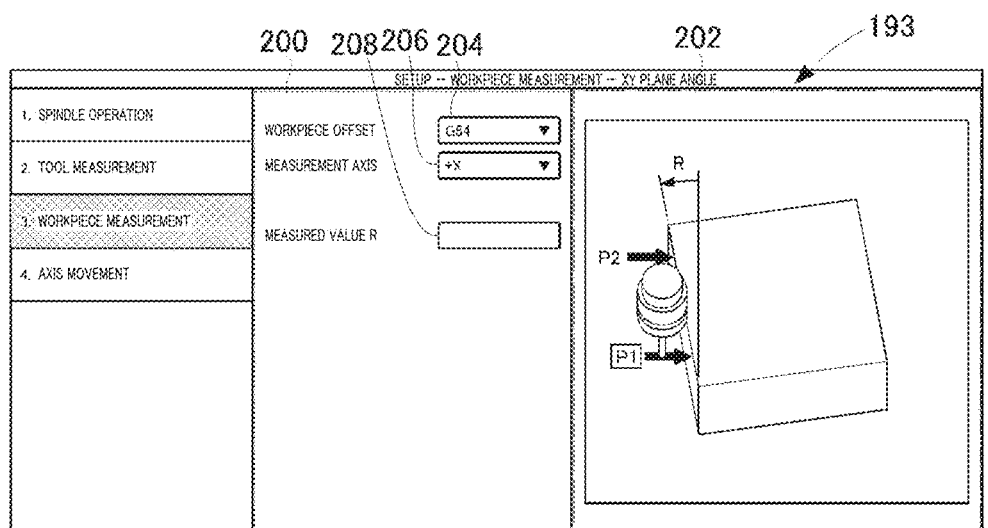

FIGS. 13A and 13B are diagrams illustrating screen transitions of the setup screen for workpiece measurement.

The workpiece measurement can be performed in accordance with the following procedures by using the setup screen for workpiece measurement. Assume that the operation mode has been switched to the jog mode (manual operation mode) by operation of the mode selection buttons 60 described above.

When any of the measurement functions on the function selecting screen 181 is selected by the operator (FIG. 13A), the display control unit 132 switches the function selecting screen 181 to a function detail screen 193 (FIG. 13B). The function detail screen 193 includes a setting screen 200 and a guidance screen 202 arranged laterally.

As illustrated in FIG. 13B, when "XY plane angle" is selected as the measurement function, a workpiece offset setting part 204, a measured axis setting part 206, and a measured value display part 208 are provided on the setting screen 200. The workpiece offset setting part 204 displays a pull-down menu and receives specification of any of G codes (G54 to G59) to be a workpiece zero point. The measured axis setting part 206 displays a pull-down menu, and receives setting of a measurement direction (+X direction, −X direction, or the like) of the sensor. The measured value display part 208 displays an angle R (measured value) calculated from the detection result of the sensor. The guidance screen 202 displays a video of a method of measuring the "XY plane angle".

More specifically, two points (P1 and P2) detected by the sensor are displayed on the guidance screen 202. When the operator selects cycle start (presses the START button) while P1 on the guidance screen 202 is highlighted, the position P1 is measured. Thereafter, when an axis of the sensor is moved, P2 on the guidance screen 202 is highlighted. When cycle start is selected (the START button is pressed) in this state, the position P2 is detected. The computation unit 131 calculates the angle R from the positions P1 and P2. The display control unit 132 displays the measured value R, which is the calculation result (that is, the measurement result), on the setting screen 200.

The measured numerical values are automatically stored as information of the workpiece coordinate system into the data storage unit 114. The display control unit 132 reflects the measurement result in the screen display. Alternatively, in a modification, the measured numerical values may be stored in the data storage unit 114 by operations input by the operator.

Figure 14:
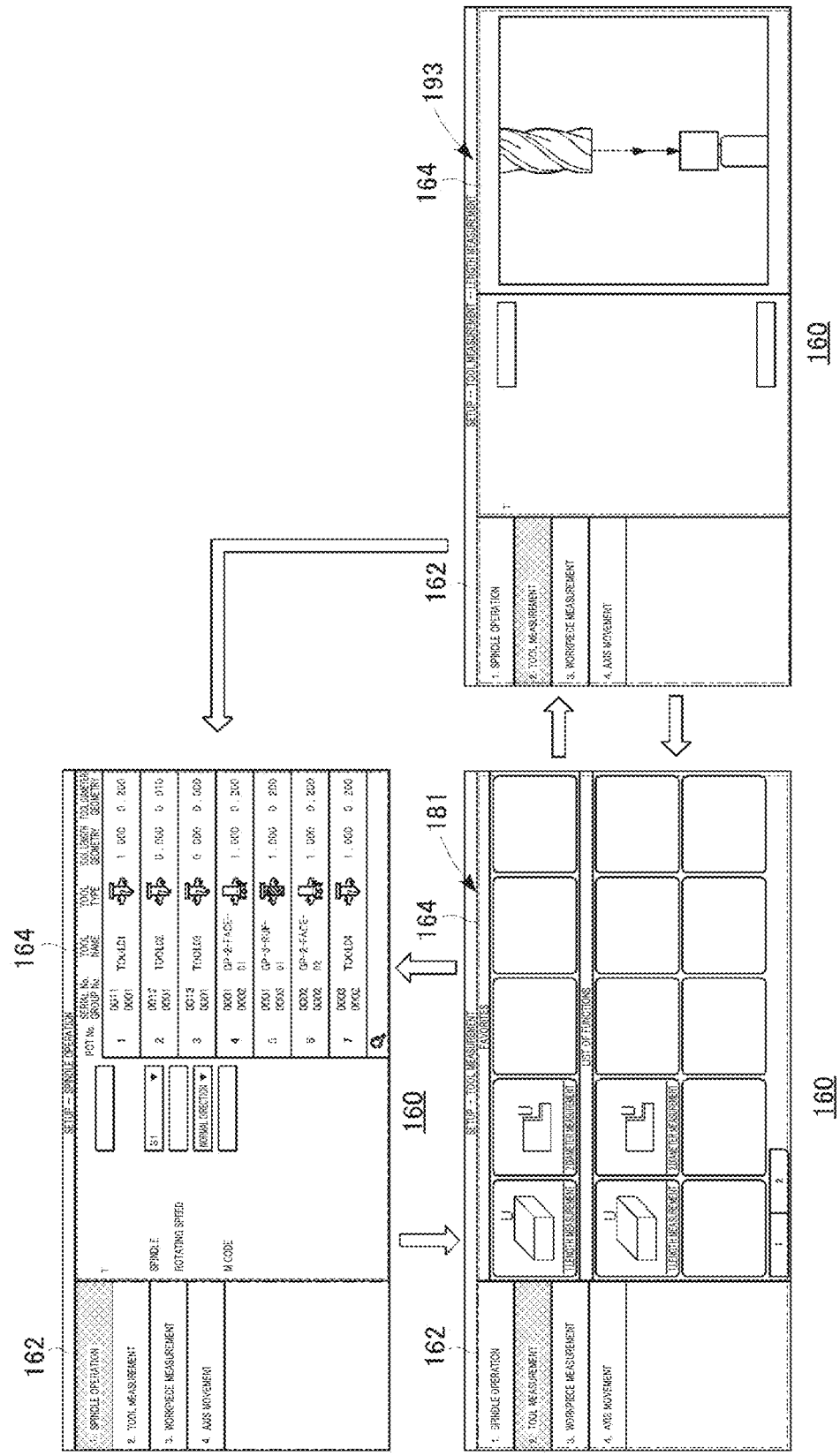
FIG. 14 is a diagram illustrating a screen transition of a setup screen.

FIG. 14 is a diagram illustrating a screen transition of the setup screen 160.

While the setup screen 160 is displayed, the display control unit 132 maintains display of a plurality of setup items on the menu display part 162 and switches display of the operation screen on the detail display part 164 in response to operations input by the operator. When any of the setup items on the menu display part 162 is selected in the process of switching display of the operation screen, the display control unit 132 displays the top screen of the operation screens associated with the selected setup item.

Figure 15:
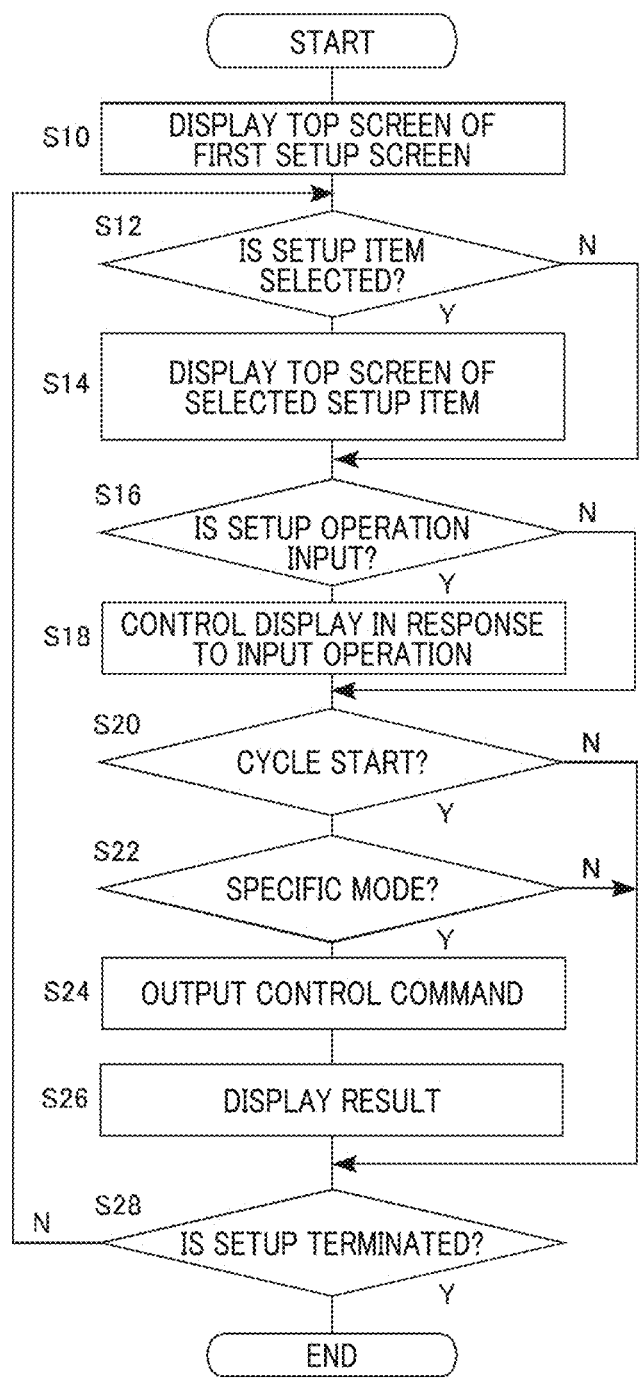
FIG. 15 is a flowchart illustrating basic procedures of a setup process.

FIG. 15 is a flowchart illustrating basic procedures of a setup process.

The present process is triggered by setting of the setup screen 160 on the main screen display area 152 by the operator. The display control unit 132 first displays the top screen of the first setup screen (S10). In the present embodiment, the top screen of the setup screen for spindle operation is displayed.

When the operator refers to the menu display part 162 and selects any of the setup items (Y in S12), the display control unit 132 displays the top screen of the selected setup item (S14). If no setup item is selected (N in S12), the process in S14 is skipped.

When any operation is input via the operation screen by the operator (Y in S16), the display control unit 132 performs control of display in response to the input operation (S18). Specifically, the display control unit 132 performs display depending on the setup operation such as spindle operation, tool measurement, workpiece measurement, or the like described above. If no setup operation is input (N in S16), the process in S18 is skipped.

Then, when cycle start is selected (the START button is pressed) by the operator (Y in S20), and if the operation mode is a specific mode (Y in S22), the control command unit 130 outputs control commands associated with the setup setting to the machining control device 102 (S24). In the present embodiment, the "jog mode" is set as the specific mode as described above. Thus, commands on control associated with setup operations such as spindle operation, tool measurement, workpiece measurement, or the like are issued.

In this process, when a result (a measurement result or the like) based on the control is obtained, the result is displayed (S26). If the operation mode is not a specific mode (N in S22), the processes in S24 and S26 are skipped. If cycle start is not selected (N in S20), the processes in S22 to S26 are skipped.

The processes in S12 to S26 are repeated until a predetermined setup termination condition is met, such as until settings on the setup screen 160 in the main screen display area 152 are cancelled (N in S28). When a setup termination condition is met (Y in S28), the present process is terminated.

The machine tool 1 has been described above on the basis of the embodiment.

According to the present embodiment, because the setup items are always displayed at a fixed position on the setup screen 160, the operator easily recognizes the setup items. In addition, when a setup item on the menu display part 162 is selected regardless of the type of the setup item being displayed or the layer of the operation screen, the top screen of the setup item can be displayed. Thus, troublesome operations such as going back through the layers of the operation screens when the operator switches the setup item can be reduced. Because the menu display part 162 and the detail display part 164 are displayed to be adjacent to each other, only the operation screen on the detail display part 164 needs to be operated after any setup item is selected, which can provide uniform operational feelings for a plurality of setup items. This can prevent or reduce distraction of the operator from the operation of the setup screen. As a result, the user-friendliness of the screens used for setup work is improved.

Modifications

Figure 16A:
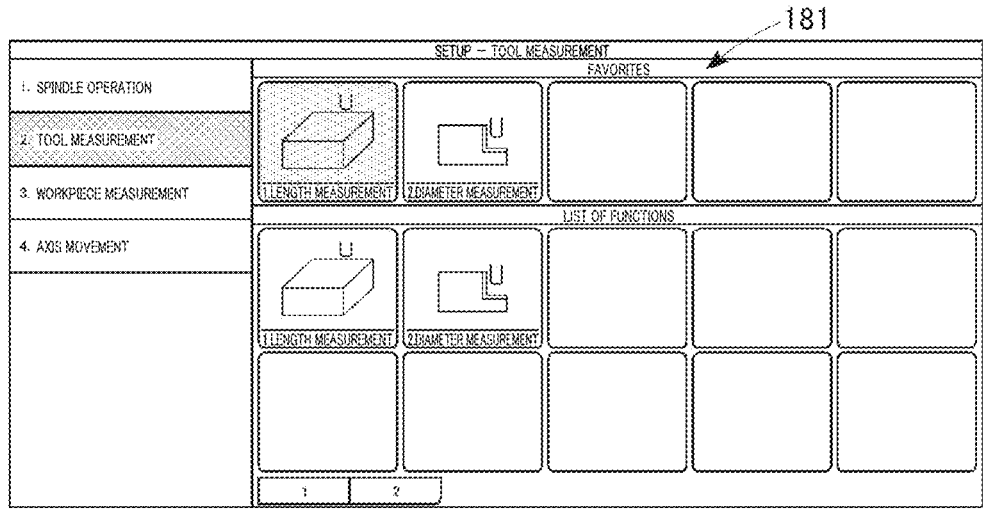
FIGS. 16A to 16C are diagrams illustrating screen transitions of the setup screen for tool measurement according to a modification.
Figure 16B:
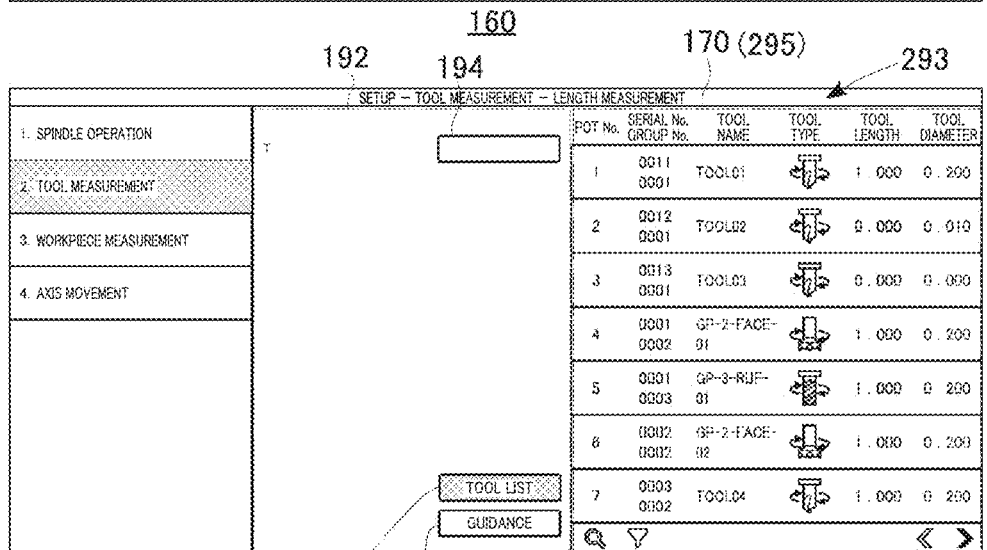
Figure 16C:
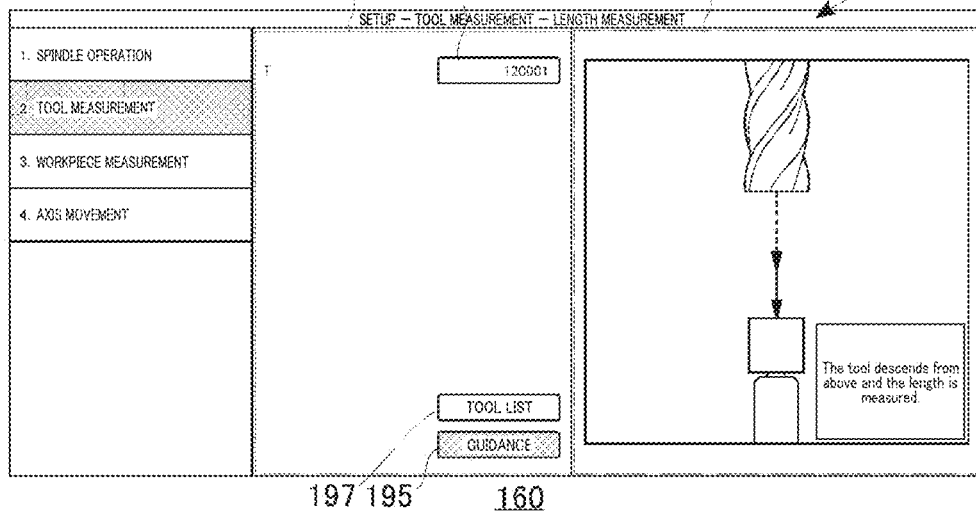

FIGS. 16A to 16C are diagrams illustrating screen transitions of the setup screen for tool measurement according to a modification.

In this modification, when the operator selects any of the measurement functions on the function selecting screen 181 (FIG. 16A), the display control unit 132 switches the function selecting screen 181 to a function detail screen 293. The function detail screen 293 includes a setting screen 192 and a setting detail screen 295. On the setting detail screen 295, the tool reference screen 170 and the guidance screen 196 are displayed in a switchable manner (FIGS. 16B and 16C). In this modification, the tool reference screen 170 is first displayed when the function selecting screen 181 is switched to the function detail screen 293. Alternatively, the guidance screen 196 may be first displayed.

The setting screen 192 includes a guidance button 195 and a tool list button 197. When the guidance button 195 is selected in a state in which the tool reference screen 170 is displayed, the display control unit 132 switches the tool reference screen 170 to the guidance screen 196. Conversely, when the tool list button 197 is selected in a state in which the guidance screen 196 is displayed, the display control unit 132 switches the guidance screen 196 to the tool reference screen 170.

When the guidance button 195 is selected, a video of a guidance of the selected tool measurement is displayed on the guidance screen 196 and such captions as "the tool descends from above and the length is measured" are displayed. Note that, in addition to or instead of display of the captions, guidance audio may be output. The guidance may be a video such as animation or still images.

While an example of a guidance screen relating to tool measurement is presented in this modification, captions may also be displayed and guidance audio may also be output with a guidance (a video or still images) on the guidance screen for workpiece measurement.

Figure 17A:
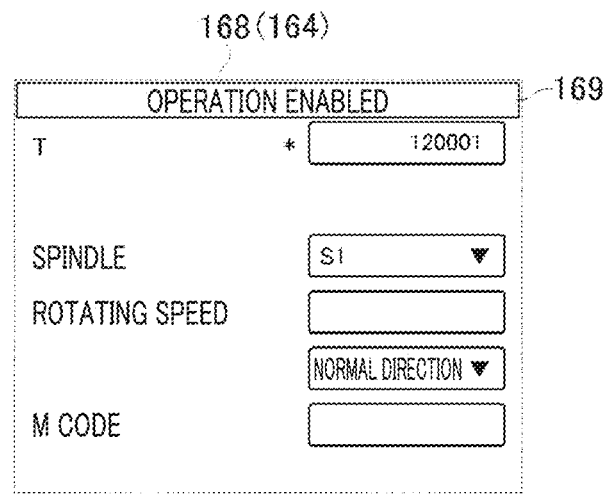
FIGS. 17A to 17C are diagrams illustrating display control of a setup screen according to a modification.
Figure 17B:
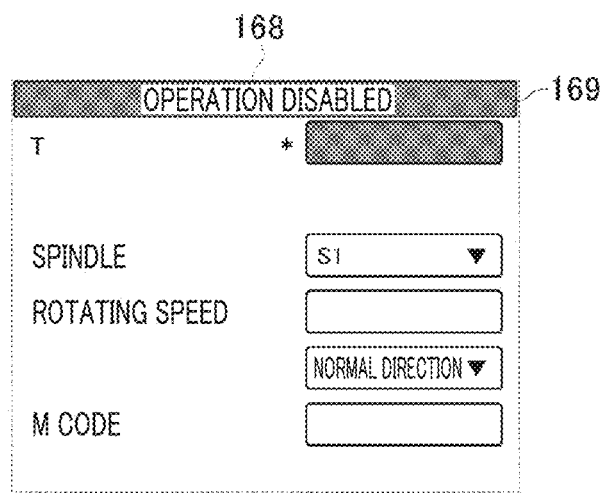
Figure 17C:
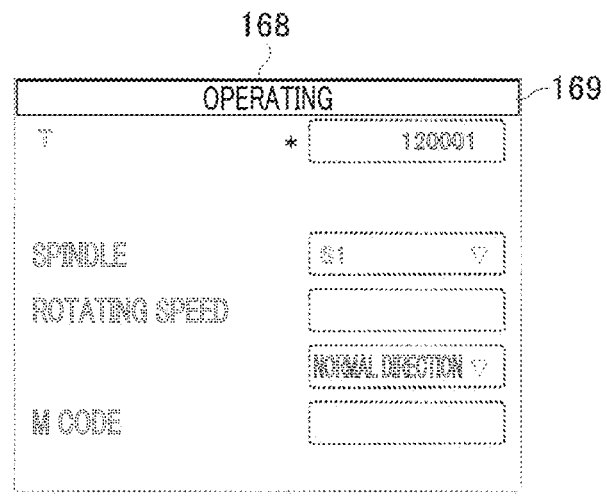

FIGS. 17A to 17C are diagrams illustrating display control on a setting screen according to a modification. Herein the setting screen 168 of the setup screen for spindle operation is presented as an example.

In this modification, required parameters that are required to be input on the setting screen 168 are set. Specifically, as illustrated in FIG. 17A, among the tool setting part (T), the spindle selecting part, the rotating speed setting part, and the M code setting part, the tool setting part (T) is a required parameter and a mark "*" indicating a required field is displayed next to the input field. If the required parameter is not input, operation (control output) for setup cannot be performed.

A state display part 169 for indicating whether operation is enabled or disabled or the operation state is provided at the top of the setting screen 168. If all the required parameters are input by the operator, the operation for setup (hereinafter, also simply referred to as "operation") is enabled. In this case, the display control unit 132 displays "operation enabled" on the state display part 169 (FIG. 17A).

In contrast, if any of the required parameters is not input, the operation cannot be performed. Thus, the display control unit 132 displays "operation disabled" on the state display part 169 and displays an indicator prompting to input to the input field of the tool setting part (T) (FIG. 17B). If the operation is currently being performed, an interlocked state is entered, and the display control unit 132 displays "operating" on the state display part 169 and disables input to the input fields on the setting screen 168 by graying out the input fields (displaying the screen in light color) or the like (FIG. 17C).

While an example of spindle operation is presented in the example of FIGS. 17A to 17C, similar display control may be performed on the setting screens of other setting items such as tool measurement and workpiece measurement.

Figure 18:
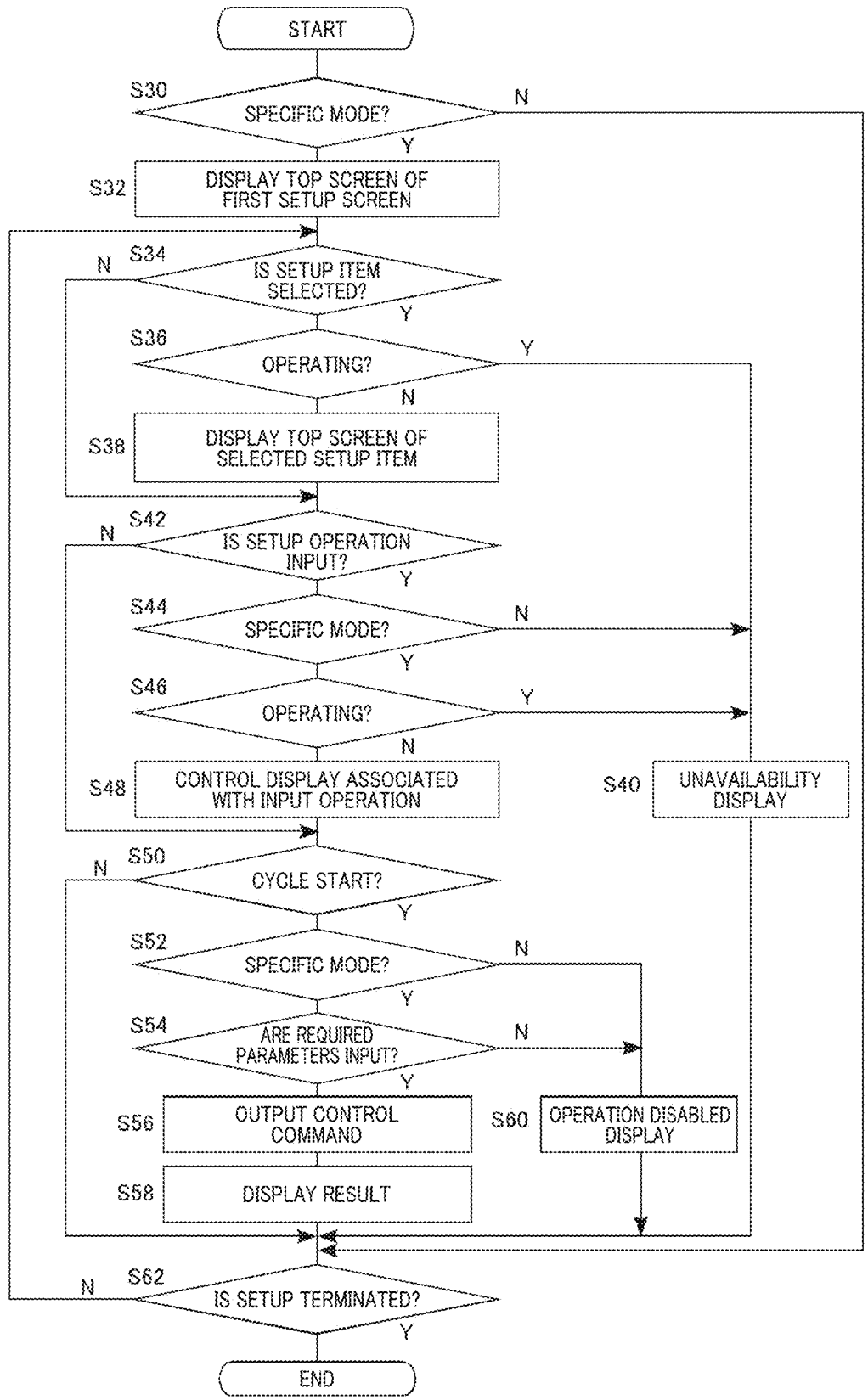
FIG. 18 is a flowchart illustrating procedures of a setup process according to a modification.

FIG. 18 is a flowchart illustrating procedures of a setup process according to a modification.

This setup process is performed provided that the control mode of the machine tool 1 is a specific mode (Y in S30). The "specific mode" in this modification is a manual operation mode such as a jog mode or a handle mode, which is set in advance. The display control unit 132 first displays the top screen of the first setup screen (S32).

When the operator selects any of the setup items (Y in S34) and if the operation is not currently being performed (N in S36), the display control unit 132 displays the top screen of the selected setup item (S38). If the operation is being performed (Y in S36), the display control unit 132 makes unavailability display such as displaying the menu display part 162 in light color to indicate the interlocked state (S40). If no setup item is selected (N in S12), the processes in S34 and S36 are skipped.

When any operation is input via the operation screen by the operator (Y in S42) and if the control mode is a specific mode (Y in S44) and the operation is not being performed (N in S46), the display control unit 132 performs display control in response to the input operation (S48). Specifically, the display control unit 132 performs display depending on a setup operation such as spindle operation, tool measurement, workpiece measurement, or the like described above. If the control mode is not a specific mode (N in S44) or if the operation is being performed (Y in S46), the display control unit 132 makes unavailability display (S40). If no setup operation is input (N in S42), the processes in S44 to S48 are skipped.

Then, when cycle start is selected (the START button is pressed) by the operator (Y in S50) and if the control mode is a specific mode (Y in S52) and all the required parameters are input (Y in S54), the control command unit 130 outputs control commands associated with the setup setting to the machining control device 102 (S56). Specifically, commands on control associated with setup operations such as spindle operation, tool measurement, workpiece measurement, or the like are issued. As a result, the operation for setup is started.

In this process, if a result (measurement result, etc.) based on the control is obtained, the result is displayed (S58). If the control mode is not a specific mode (N in S52) or any the required parameters is not input (N in S54), the display control unit 132 performs operation disabled display to announce that the operation is disabled. If cycle start is not selected (N in S50), the processes in S52 to S58 are skipped.

The processes in S34 to S60 are repeated until a predetermined setup termination condition is met (N in S62). When a setup termination condition is met (Y in S62), the present process is terminated.

Figure 19:
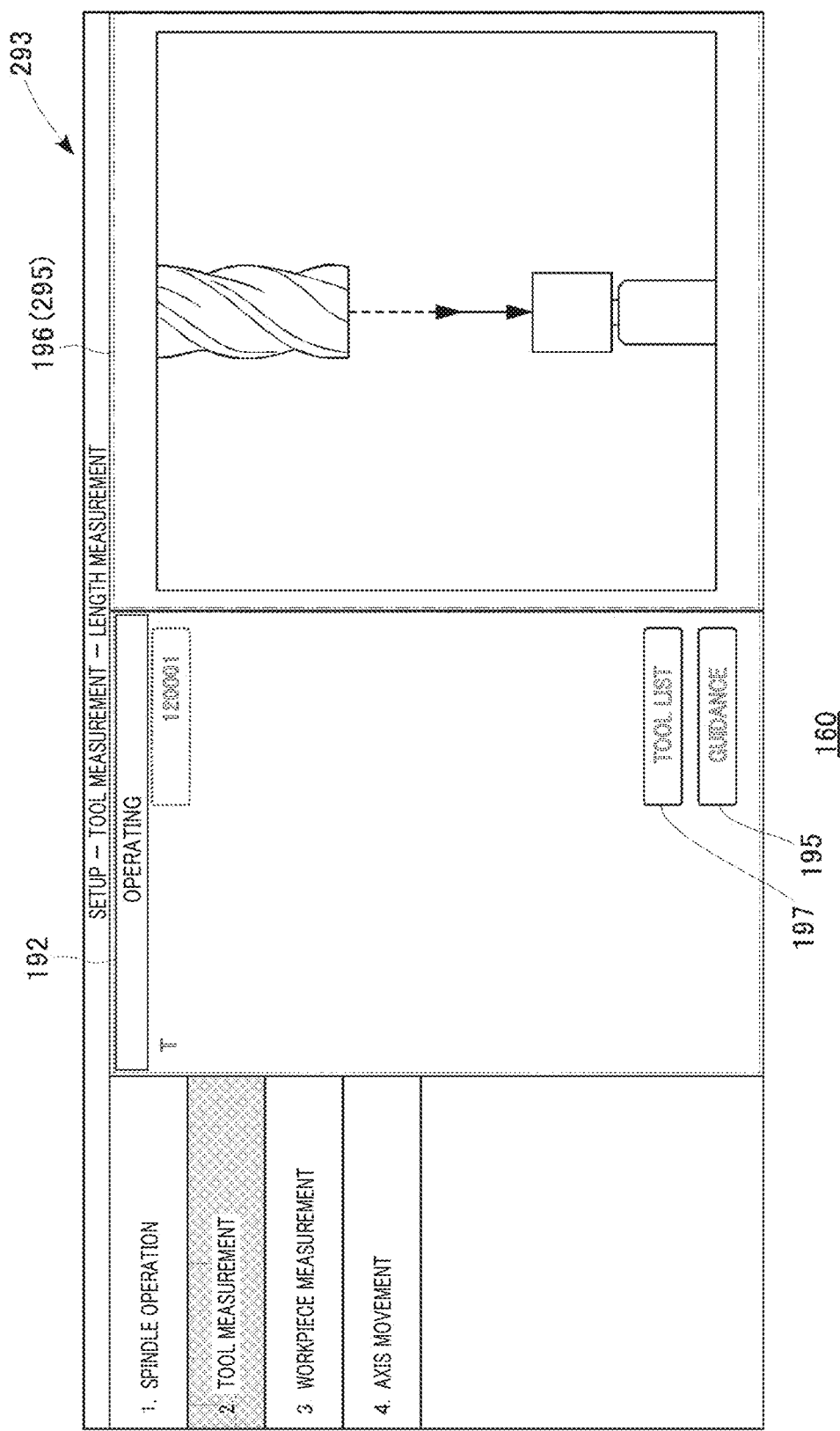
FIG. 19 is a diagram illustrating a screen transition of a setup screen according to a modification.
Figure 20:
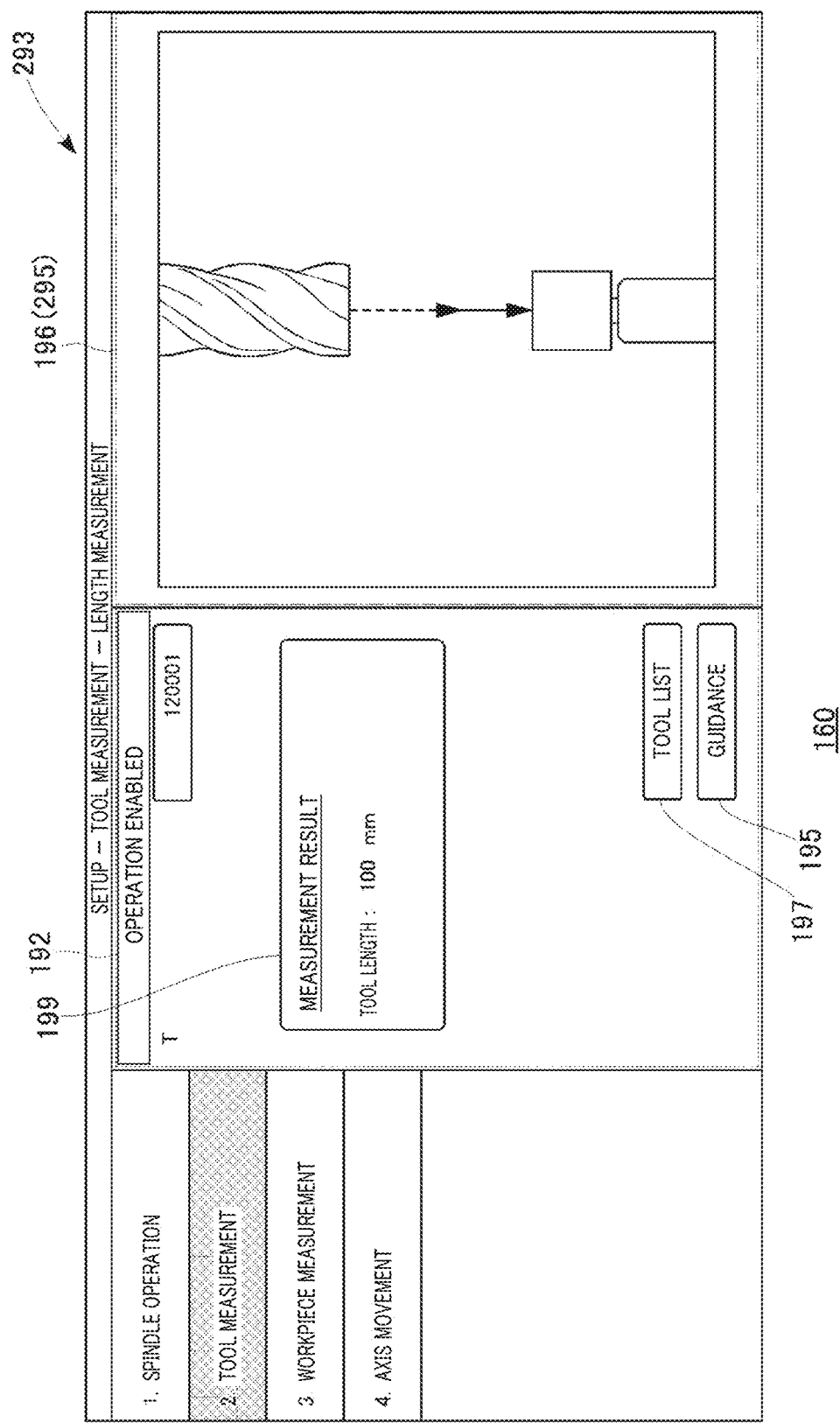
FIG. 20 is a diagram illustrating a screen transition of a setup screen according to a modification.

FIGS. 19 and 20 are diagrams illustrating screen transitions of a setup screen according to a modification.

In this modification, after setup is performed using guidance display and the like, cycle start is selected (the START button is pressed) to make the machine tool operate. When the button is pressed, the setup screen 160 becomes in a kind of interlocked state as illustrated in FIG. 19, in which operations on the setting screen 192 (selection of buttons, input of parameters and data, and the like) cannot be performed (disabled). Then, when the operation is terminated, that is, when the measurement is terminated in FIGS. 19 and 20, a measurement result 199 is displayed on the setting screen 192 as illustrated in FIG. 20. The interlocked state is also canceled when the operation is terminated. According to this modification, measurement is started when operation is instructed by an operation input by the operator, and the result thereof is then displayed. Thus, smooth setup work is achieved. While an example of tool measurement is presented in this modification, it is needless to say that similar configuration can also be used for workpiece measurement, spindle operation, and axis movement. In addition, while the operation is explained by referring to operation for measurement in this modification, similar processes are to be performed in operation for machining. For example, when the setup is terminated and the operation for machining in the machine tool is to be started, cycle start is selected. While machining is performed after the machining cycle is started, a state in which various inputs and various selections on the setup screen are disabled (an interlocked state) is entered, and only input values and selections before cycle start can be checked. After the machining is terminated, a machining result is displayed on the screen and the interlocked state is canceled.

Figure 21:
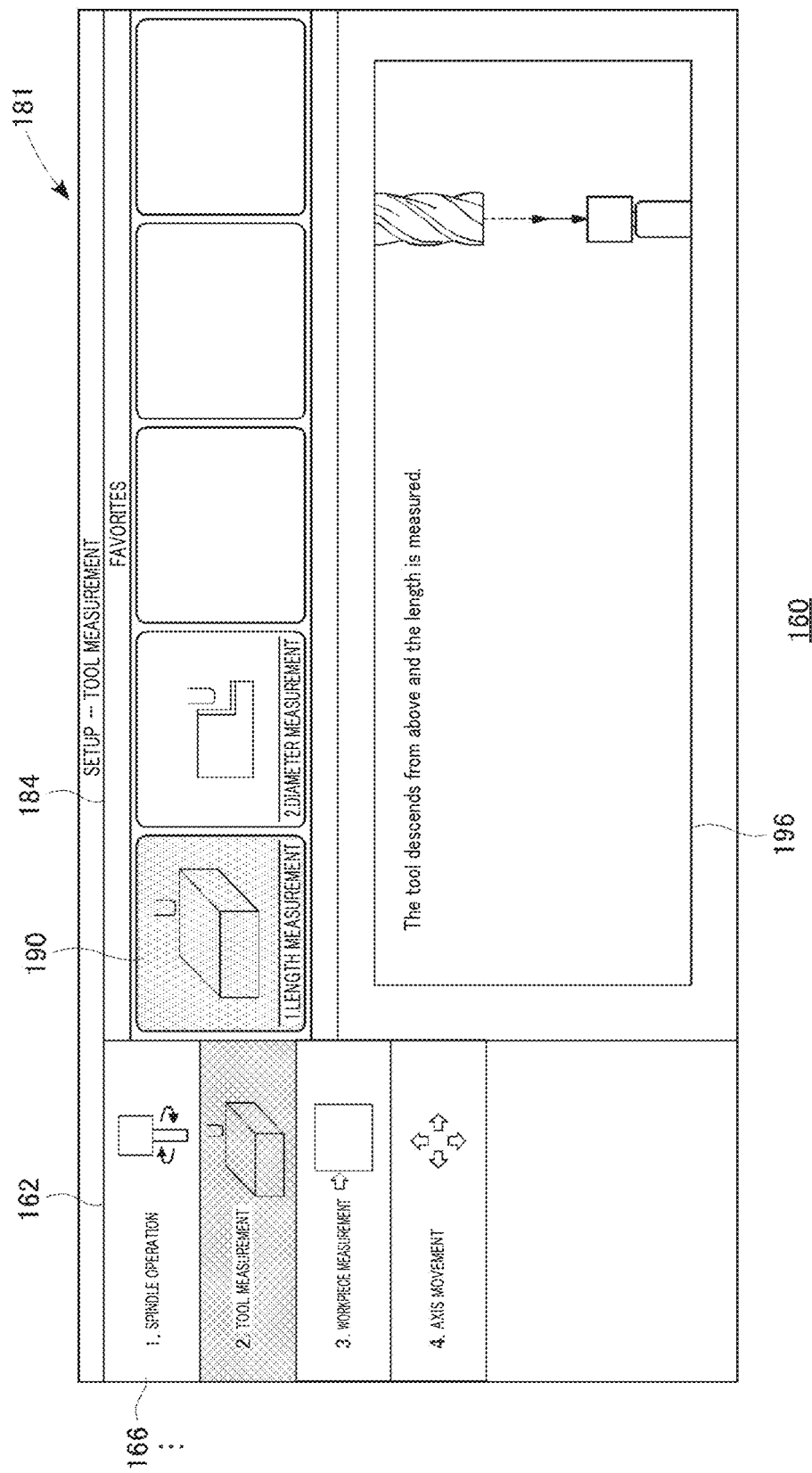
FIG. 21 is a diagram illustrating a screen transition of a setup screen according to another modification.

FIG. 21 is a diagram illustrating a screen transition of a setup screen according to another modification.

In this modification, characters and icon images representing the setup items are also displayed on the menu display part 162. For example, on a button for tool measurement in FIG. 21, a text "tool measurement" and an icon image schematically illustrating the tool measurement (an icon image of length measurement in FIG. 21) are displayed. When the button for tool measurement on the menu display part 162 is selected, the function selecting screen 181 is displayed, the buttons for length measurement and diameter measurement are displayed, and icon images showing the measurement details are displayed on the respective button surfaces in FIG. 21. In FIG. 21, when a button with the icon image of any of the measurement displayed on the specified measurement display part 184 (favorite screen) of the function selecting screen 181 is selected, the guidance screen 196 is displayed under the specified measurement display part 184, and guidance indicating the selected measurement (explanation of the selected measurement) is displayed. The displayed guidance includes texts explaining details of the selected measurement and a video or still images showing what the selected measurement is like. While the measurement list display part 182 (see FIG. 10) is switched to the guidance screen 196 in FIG. 21, the display is not limited thereto. For example, when a button with the icon image of measurement displayed on the measurement list display part 182, the guidance screen 196 may be displayed above the selected button. In any case, according to this modification, the type of the selected measurement and the guidance therefor can be viewed on one screen.

Other Modifications

In the embodiment described above, an example in which the operation control device 100 also functions as a "display control device" has been presented. Specifically, the operation control device having the configuration illustrated in FIG. 4 is explained as a form of a "display control device". This display control device includes an input unit for directly receiving an operation input by the operator. In a modification, an external computer connected with the machine tool 1 to communicate with the machine tool 1 may also function as a "display control device". Alternatively, in the machine tool, an internal computer connected with the operation control device to communicate with the operation control device may also function as a "display control device". The display control device includes a "display control unit", but need not include a "display unit". Such a display control device may include an input unit (reception unit) for receiving information (operation information) based on an operation input by the operator and received by an operation input unit of the operation control device. The display control device may be a typical laptop personal computer (PC) or a tablet computer.

In the embodiment described above, an example in which page switching is enabled on the tool detail display part 173 as illustrated in FIGS. 8A and 8B has been presented. In a modification, the tool detail display part 173 may be laterally expandable, so that more detailed information can be displayed on a single screen, for example.

In the embodiment described above, for operation of the spindle in setup work, the operation state of the machine tool is assumed to have been switched to the jog mode (manual operation mode). In a modification, the operation state may be assumed to have been switched to other modes such as a special mode for setup.

While an example of a machining center in which a rotating tool is move relative to a workpiece has been presented as the machine tool in the embodiment described above, the machine tool may be a turning center in which a tool is moved relative to a rotating workpiece, or an additive manufacturing machine in which materials are melted by laser and deposited. Alternatively, the machine tool may be a combined machine having these functions in combination.

The present invention is not limited to the embodiments and modifications thereof described above, and any component thereof may be modified and embodied without departing from the scope of the invention. Components described in the embodiments and modifications may be combined as appropriate to form various embodiments. Some components may be omitted from the components presented in the embodiments and modifications. Furthermore, the present invention can be implemented as a system, a device, a method, a program, and a storage medium, among others. Specifically, the present invention may be applied to a system including multiple devices (a host computer, an interface device, web applications, and the like) or to a device constituted by a single device.

A recording medium recording program codes of software implementing the functions described above may be supplied to a system or a device, and a computer (CPU, MPU) of the system or the device may read and execute the program codes stored in the recording medium. In this case, the program codes themselves read from the storage medium implement the functions in the embodiment described above, and the storage medium storing the program codes constitutes the aforementioned device.

What is claimed is:

1. A display control device comprising:
    a display control unit that controls display of a setup screen for performing setup for machining in a machine tool, the setup screen including (i) a menu display part displaying, in a selectable manner, a plurality of setup items including spindle operation relating to operation of a spindle and a tool measurement relating to measurement of a tool and (ii) a detail display part displaying an operation screen for each of the setup items, wherein
    an operation screen associated with the setup item of spindle operation is a screen that receives input of information relating to a tool and receives input of a value relating to a spindle rotating speed,
    an operation screen associated with the setup item of tool measurement is a screen that displays images indicating tool measurement types of tool measurement respectively and receives selection of a tool measurement type of tool measurement among tool measurement types, and while the setup screen is displayed, the display control unit maintains display of the setup items on the menu display part and switches display of the operation screens on the detail display part in response to an operation input by an operator.

2. The display control device according to claim 1, wherein operation screens associated with the setup item of tool measurement include a function selecting screen for inputting information specifying a type of tool measurement and a tool selection screen for inputting information specifying a tool to be measured, and when any of the setup items on the menu display part is selected during display of the operation screens being switched between each other, the display control unit displays a top screen of operation screens associated with the selected setup item.

3. The display control device according to claim 2, wherein the operation screens associated with the setup item of tool measurement further include a function detail screen displaying function details for each type of tool measurement, and when a type of tool measurement is selected on the function selecting screen and a tool to be measured is selected on the tool selection screen, the display control unit displays a function detail screen associated with the selected type of tool measurement on the detail display part.

4. The display control device according to claim 2, wherein the tool selection screen displays a tool list display part displaying a list of identification information of tools that are selectable as a tool to be measured and a tool detail display part displaying detailed information of each tool in association with the identification information, the tool list display part and the tool detail display part being displayed to be adjacent to each other, the tool list display part receives selection of a tool to be measured, on the tool detail display part, display is switchable between a plurality of types of detailed information, and the display control unit switches display of the detailed information on the tool detail display part in response to an operation input by an operator while the operation screen is displayed.

5. A machine tool comprising:

a display control unit that controls display of a setup screen for performing setup for machining, the setup screen including (i) a menu display part displaying, in a selectable manner, a plurality of setup items including spindle operation relating to operation of a spindle and tool measurement relating to measurement of a tool and (ii) a detail display part displaying an operation screen for each of the setup items, wherein an operation screen associated with the setup item of spindle operation is a screen that receives input of information relating to a tool and receives input of a value relating to a spindle rotating speed, an operation screen associated with the setup item of tool measurement is a screen that displays images indicating tool measurement types of tool measurement respectively and receives selection of a tool measurement type of tool measurement among tool measurement types, and while the setup screen is displayed, the display control unit maintains display of the setup items on the menu display part and switches display of the operation screens on the detail display part in response to an operation input by an operator.

6. A display control device comprising:

a display control unit that controls display of a setup screen for performing setup for measurement, the setup screen including (i) a menu display part displaying, in a selectable manner, a plurality of measurements including tool measurement relating to measurement of a tool and workpiece measurement relating to measurement of a workpiece and (ii) a detail display part displaying an operation screen for each of the measurements, an operation screen associated with the tool measurement is a screen that displays a plurality of visible images each representing a tool measurement operation and receives selection of a tool measurement operation that is selected by selecting one of the visible images, an operation screen associated with the workpiece measurement is a screen that displays a plurality of visible images representing workpiece measurement operations of workpiece measurement respectively and receives selection of a workpiece measurement operation that is selected by selecting one of the visible images, and while the setup screen is displayed, the display control unit maintains display of a plurality of measurements on the menu display part and switches display on the detail display part in response to an operation input by an operator.

7. A machine tool comprising:

a display control unit that controls display of a setup screen for performing setup for measurement, the setup screen including (i) a menu display part displaying, in a selectable manner, a plurality of measurements including tool measurement relating to measurement of a tool and workpiece measurement relating to measurement of a workpiece and (ii) a detail display part displaying an operation screen for each of the measurements, an operation screen associated with the tool measurement is a screen that displays a plurality of visible images each representing a tool measurement operation and receives selection of a tool measurement operation that is selected by selecting one of the visible images, an operation screen associated with the workpiece measurement is a screen that displays a plurality of visible images representing workpiece measurement operations of workpiece measurement respectively and receives selection of a workpiece measurement operation that is selected by selecting one of the visible images, and while the setup screen is displayed, the display control unit maintains display of a plurality of measurements on the menu display part and switches display on the detail display part in response to an operation input by an operator.

* * * * *